United States Patent Office 3,095,409
Patented June 25, 1963

3,095,409
ACID TREATED SULFONATED LIGNIN-CONTAINING MATERIAL AND PROCESS FOR THE PRODUCTION THEREOF
Ellis Gray King and Carl Adolphson, Bellingham, Wash., assignors to Puget Sound Pulp & Timber Co., Bellingham, Wash., a corporation of Delaware
No Drawing. Filed Apr. 1, 1960, Ser. No. 19,165
36 Claims. (Cl. 260—124)

Our invention and discovery relates to specially treated sulfonated lignin-containing material, and has reference to processes for preparing said material and to the material per se.

More particularly our invention relates to processes for the production of novel sulfonated lignin-containing materials useful in drilling fluid additives, and to the products of such processes.

The improved effectiveness of the components of the sulfonated lignin-containing material provided by our invention and discovery renders them suitable as a drilling mud additive, or as the base from which an improved drilling mud can be formed, which mud is characterized by having greatly improved properties.

This application is a continuation-in-part of our copending application Serial No. 433,794, filed June 1, 1954, entitled "Process of Improving the Effectiveness of the Components of Spent Sulfite Liquor and the Products Thereof"; our copending application Serial No. 539,542, filed October 10, 1955, now U.S. Patent No. 2,935,504, entitled "Process of Improving the Effectiveness of the Components of Spent Sulfite Liquor and the Products Thereof"; our copending application Serial No. 769,185, filed October 23, 1958, entitled "A Process for Providing an Improved Drilling Fluid and the Product Thereof"; our copending application Serial No. 789,775, filed January 29, 1959, entitled "A Process for Providing an Improved Drilling Mud of Clay and a Metal Lignosulfonate and the Product Thereof"; and our copending application Serial No. 806,974, filed April 16, 1959, entitled "An Improved Gypsum Base Drilling Fluid and the Products Thereof"; our copending application Serial No. 723,036, filed March 21, 1958; and our copending application Serial No. 815,294, filed May 25, 1959 now Patent No. 2,935,473. The methods of treating sulfonated lignin-containing material through oxidation and salt formation in improving the dispersive properties of said sulfonated lignin-containing material and the combination of said additive products with clay and water in forming drilling muds are completely disclosed in said copending applications. Furthermore the unexpected resistance of such muds to the contaminants encountered in oil well drilling was also set forth.

The outstanding properties of suitable magnitude which characterize a useable and practical drilling mud comprise the following: (1) initial gel strength; (2) viscosity; (3) 10-minute gel strength; and (4) water loss, which relates to the sealing off of the wall of the drilling hole by building up a filter cake of mud on the wall, thus preventing loss of water from the mud. Thus, it is manifest that the drilling mud, with its exacting requirements of various properties for the mud, is a most important, involved, and complex feature of oil and gas well drilling.

Universally, a drilling mud (having about the consistency of lubricating oil) is used in a circulating system with rotary well drilling mechanism, and is forced by pumping down the hollow drill stem through the bit which it lubricates and cools, then back to the surface to a settling pit. Thus it washes out the cuttings which have been made from the hole, and the cuttings are carried outside the drill stem to the surface where the coarse particles are caused to be removed and the mud again used in a continuous circulating process. To prevent the loss of the mud in porous strata, the mud must be of a character to seal off such strata and the mud, by its hydrostatic pressure, must prevent the escape of gas, that is prevent the well from blowing out. To provide the proper hydrostatic pressure, the specific gravity of the mud may be increased by adding heavier material than clay, such as barytes. On the other hand the drilling fluid must have the proper viscosity, that is, be thick enough to carry out the cuttings, but thin enough to be pumped and to allow the coarse particles to settle out in the surface mud pits so that the mud may be re-used.

Our invention and discovery is characterized by making it possible to greatly improve the effectiveness of the components of said sulfonated lignin-containing material with very simple and inexpensive equipment. The simplicity of the treatment of our invention and discovery is one of its outstanding features.

One important property of drilling mud is that in case of temporary stoppage of work, the mud should "gel" sufficiently to prevent settling of the suspended cuttings, which settled cuttings would "seize" the drill stem and prevent re-starting or its withdrawal from the well. From this it is manifest that the viscosity of the fluid is highly important. Likewise, the property to gel or to set like gelatin is important when the agitation incident to drilling ceases. Thus, the mud will hold in suspension the cuttings and at the same time become fluid when agitation is resumed. This is called the "thixotropic" property of the fluid, or its gel strength. Most clays have this property but not all. Such property may be increased by adding the clay called bentonite and similar substances. As the drilling proceeds through different strata, the viscosity and gel strength may be affected by the character of the strata, by the loss by absorption of water in the porous strata or in the inflow of water and other fluids, by temperature changes, or by chemically active substances which may enter the drilling fluid as the drilling proceeds. Accordingly, viscosity, gel and water loss are very carefully watched and corrected from time to time during the drilling. There are instruments provided for testing such properties at the mouth of the well.

In the early history of well drilling, water was added to thin the mud, but this had the objectionable result of reducing the specific gravity of the drilling fluid and thereby decreased its hydrostatic pressure property, and also decreased its ability to suspend the cuttings and the barytes which had been added to give weight. Also, to overcome the effect of addition of chemicals from the strata through which the well proceeded, i e., the effect from so-called contaminants, other chemicals were added to offset the deleterious effects.

In fact, the literature relating to drilling muds is so extensive and comprehensive and has extended over such a long period of time that it is very apparent that important difficulties, mechanical, chemical and economical, are involved in the controlling, conditioning, and obtaining of the proper type of drilling mud. It is one of the fundamental objects and purposes of this invention and discovery to provide a drilling fluid containing an inexpensive and highly effective mud additive to overcome the problem that have existed for so long in this field. Let it always be kept in mind that the value of the drilling mud depends on how much it will contribute to speed, efficiency, and safety in oil and gas well drilling. Our invention and discovery permits a combination of clay and treated sulfonated lignin-containing material, which combination is characterized by its economy as well as its very special effectiveness, not only for one of the two primary recognized types of drilling muds, i.e., "lime base" and "fresh water" muds, but for the special effectiveness of both of said types of mud.

An important and fundamental object of our invention is to provide additives permitting the production of a gypsum base mud characterized by a low gel rate rather than the usual objectionable high gel rate which is usually accompanied by high flat gels. Such muds accomplish the maintaining of suitable gels so that cuttings fall out in the mud pit without the necessity of watering back to thin the mud. In this way, the need for costly water loss reducing agents such as carboxy-methylcellulose is substantially lessened, if not eliminated, and the amount of expensive weighting agents required for deep wells is decreased.

RELATIVE CONTAMINANTS

In the drilling of deep wells such as oil and gas by the employment of a mud laden drilling fluid as in the rotary system of drilling, strata of a contaminating character may be encountered in large masses which often supply calcium sulfate to the drilling mud—this is very disadvantageous and alters or destroys required properties of the mud. Such calcium sulfate may be, among other forms, in the form of gypsum (calcium sulfate with water of crystallization) and anhydrite (calcium sulfate without water of crystallization). The literature states (Rogers, "Composition and Properties of Oil Well Drilling Fluids," page 377):

"The first small additions of calcium sulfate increase the viscosity and gel strength of the mud fluid greatly but do not increase the fluid loss appreciably. This peak portion of the viscosity curve is reached at an addition of 33.3 p.p.m. calcium per gram of bentonite. As the concentration of calcium sulfate increases, the viscosity decreases and the fluid loss increases sharply."

"As the concentration of the calcium sulfate increases, the viscosity decreases and the fluid loss increases sharply"—obviously this feature evidences unpredictable character of contaminants upon the components of the drilling muds as respect the important properties which must characterize the mud. The different properties of the mud are affected differently. Rogers further states (said text, page 378):

". . . unfortunately, the addition of the soluble sodium sulfate results in a large increase in viscosity and gel strength. This effect is of such a magnitude that the method cannot be used in the field to overcome the adverse effects of the anhydrite. It can, however, be demonstrated in the laboratory."

The discovery and invention herein disclosed shows how this objectionable feature of sodium sulfate has been overcome, and to this extent the invention and discovery of applicants is contrary to the recognized literature in this field.

Other contaminating strata are salt beds and the cement employed in the construction of the well. Also let it be noted that the contaminants may be a combination of the contaminants disclosed herein.

It is the primary and fundamental purpose of our invention and discovery to provide a drilling mud system or combination of clay and sulfonated lignin containing material which will operate in controlling the colloidal and physical properties and for maintaining the required properties of water-clay drilling mud which may be subject to contaminants, so that the mud combination will function in a more effective and more economical manner than heretofore. Thus, an important part of our invention is the rendering more effective the properties of the sulfonated lignin containing materials and herein resides protection against contamination.

This part of our invention relating to the sulfonated lignin containing materials is commonly referred to as the drilling mud additive. Our purpose is to provide such an additive of a character which will function as a control product for the colloidal and physical properties and for maintaining the required properties of the water clay drilling mud which may become subject to contaminants in the drilling operation and to provide such an additive when combined with the mud that will function in a more efficient and more economical manner than has been accomplished heretofore.

The part of our invention and discovery which relates to a further improvement in lessening water loss of gypsum contaminated muds involves the addition of sodium sulfate or equivalents as hereinafter listed to the combination of clayey material and the additive lignosulfonate product of our invention and discovery, in the proportion of 1% to 100% of said sodium sulfate or equivalents by weight of the additive lignosulfonate product, said addition being made in proportions determined by a pilot test of a drilling mud which is contaminated with calcium sulfate. The additive product of our invention in and of itself may not produce the extremely low water losses desired in some muds. The addition of the sodium sulfate and equivalents as hereinafter listed will further reduce the water loss to the desired level and at the same time said additive product prevents the large rise in viscosity and gel factors which occur when sodium sulfate alone is added to an aqueous suspension of clayey material. Thus in the presence of the additive lignosulfonate product, the ordinary adverse action of the sodium sulfate is depressed.

Sometimes the formations are of thick dolomitic lime or other rock sections which do not contribute good mud making materials. In such cases it is necessary to control or maintain the mud by addition daily of bentonite to develop the desired low fluid loss, and the pH of the mud is maintained on the alkaline side to promote hydration and dispersion of the drilled shales. The alkaline pH promotes higher viscosities in the bentonite clays, and, therefore, thinners are added and those with alkaline properties such as the sodium tannate type are preferred. These thinners, because of the presence of alkaline sodium salt, aid in the formation of sodium clays from the dispersed shales and also increase the degree of dispersion of the clays and shales and hence reduce the fluid loss to strata surrounding the hole. In general, the pH or alkalinity of such muds is maintained at about 9.0 or 10.0. At times the pH of the mud rises or is carried to the range of 10.5 to 11.5 in which the clays and bentonite present manifest appreciably higher viscosity. The treatment of these muds is with sodium hydroxide and quebracho (sodium tannate), and they are referred to as "red muds." In all of these cases, the principal contaminants are salt, cement, gypsum or anhydrite, sand, and other inert mineral matter.

When the mud viscosity becomes too high, it may be more economical to convert to the so-called lime base mud rather than to dilute with water involving the necessary addition of weighting material. At other times, the contamination becomes so bad that the chemicals are not effective and it is found necessary to convert to the lime base mud. This conversion involves the addition of an excess of lime and caustic together with a thinner such as quebracho or, preferably, lignosulfonates. This type of high pH mud with an excess of lime is hereinafter referred to as a "lime base mud" as contrasted to all of the other water clay muds previously discussed, which for convenience will be hereinafter termed "fresh water muds."

OBJECTS

In general, quebracho, as a thinner, has been used in all types of muds, both fresh water and lime base, but quebracho is an expensive commodity. Prior to the date of the invention disclosed in said copending application Serial No. 433,794, the lignosulfonates had been useful only in lime base muds where they are well known to be relatively inexpensive, but until said invention it had not been possible to use the lignosulfonates in the lower pH (less than 12, i.e., fresh water) muds not containing an excess of lime, inasmuch as they have no appreciable thinning action on such muds. One of the primary objects of this invention is to provide a drilling fluid additive comprising a specially treated soluble sulfonated lignin-containing material which is highly effective, not only as lime base muds, but also as fresh water type muds.

A primary and fundamental object is to provide a drilling fluid additive derived from acid treated spent wood pulping liquor solids in the simplest and most economical manner with relatively inexpensive equipment, and in a continuous manner to produce from these said liquor solids a soluble additive for drilling mud systems or combinations which is effective in reducing the viscosity and gels of both fresh water muds and the so-called lime base muds, even in the presence of substantial quantities of natural contaminants such as anhydrite, sodium chloride and sodium sulphate.

It is particularly the object of this invention to provide acid treated soluble spent sulfite liquor additives that are not only especially lower in cost, but are highly effective and useful in essentially all types of water clay and oil-in-water emulsion drilling muds.

Still another object of this invention is to provide a drilling mud which is prepared with saline or sea water when fresh water is not readily available. Mud prepared with sea water has special utility in off-shore drilling where fresh water must be transported to the drilling site and fresh water muds must be protected from sea water contamination. We have found that the additive of our invention is surprisingly effective as a thinner not only for gypsum base muds, but also for saline muds made up originally with sea water as the aqueous component together with commercial drilling mud clays.

DEFINING STARTING MATERIALS

Spent lignin liquors from the pulping of wood provide an inexpensive source of the raw material for our process and product, the said liquors being available in large quantity as waste products of the pulping processes. One of our aims is to conserve this waste material.

The preferred raw material is derived from the pulping of wood by the calcium bisulfite process for the manufacture of pulp. In this operation a substantial portion (20% to 70%, usually about 55%) of the wood is converted to water soluble products which at the end of the cooking process are separated from the pulp in water solution. This solution, because of the washings, is very dilute, ranging approximately from 5% to 20% solids. This solution can be used as such in our process or it can be concentrated in any one of several well known ways to a more concentrated solution which is more readily and economically handled, particularly because of the smaller volume of liquid involved. The concentrated solution can range from 30% to 70%, but handles better in the range of 40% to 50% total solids in solution. This concentration solution contains lignosulfonates as salts (for example calcium, magnesium, sodium, or ammonium salts, depending on which of these are employed in the digesting process), carbohydrates, and other complex organic compounds derived from wood, as well as inorganic compounds either present in the wood or derived from the reaction. Furthermore, digesting of wood by iron or aluminum bisulfite will give a spent sulfite liquor component which may be our raw material and which will obviate the necessity of a base exchange reaction to form the iron or aluminum salts. The concentrated solution may be used in our invention and it is very desirable to do so. However, the spent sulfite liquor can be further refined before or after processing according to our invention. For example, the spent sulfite liquor can be essentially freed of carbohydrate material by any one of a number of procedures, preferably by fermentation. Also, said carbohydrates may be removed by dialysis, by separation with organic solvents or organic bases, or by precipitation as basic lignosulfonates, for example, with lime or by salting out with salts such as calcium chloride or sodium chloride. In addition, the lignosulfonates, as well as being freed as far as possible of extraneous materials, may be fractionated as to molecular weight components.

Any of these above described products are basically derived from spent sulfite liquor solids, and are sulfonated lignin-containing materials and the degree of refining to which they are subjected either before or after the steps of our invention will depend on the quality of product desired and the economics involved. That is, refining to some extent will improve the properties of the final processed product, but the degree of improvement will not always be economically justifiable. In fact, it is an essential and outstanding feature of our invention and discovery that we can use concentrated spent sulfite liquor as such, and through a series of simple steps involving equipment which is relatively inexpensive, can produce products which are equivalent in properties, for instance, for use as drilling mud additives and dispersants, to the purified lignosulfonates.

In general, any type of wood or lignocellulosic material, the same including straw, cornstalks, bagasse and the like, which can be resolved to pulp with the separation of the lignin-containing material, may be used as a source for providing lignosulfonate in following our invention. Furthermore, changes in the final properties of the product are influenced by the conditions of the pulping process, but in general good results are obtained using the commercial spent sulfite liquor from either paper grade quality pulp or dissolving grade quality pulp.

In addition to the spent sulfite liquor derived from the acid bisulfite pulping of wood, liquors containing soluble lignin are also available from the neutral and alkaline pulping of wood or other lignocellulosic material. Such lignin-containing materials may be converted to sulfonated lignin-containing materials usable as raw materials for the process of our invention, for instance by treatment with sulfites at elevated temperatures, chlorination and heating with sodium sulfite or by other methods known to those skilled in the art, subject only to getting a soluble sulfonated lignin or one which tends to dissolve in water and which on forming the metallic salt and being oxidized is soluble. For example and not by way of limitation, sulfonated kraft lignin has been found to perform well in making the oxidized metallic salts of sulfonated lignin according to our disclosure. This is also true of sulfonated soda lignin.

In deriving sulfonated lignin containing material from wood pulping liquors varying degrees of sulfonated lignin-containing material result, depending on the well known range of conditions involved in the different methods of sulfonation. For practicing our invention the resulting sulfonated raw material should be soluble in water or in highly alkaline aqueous media and should have dispersing properties. These characteristics are in part associated with the degree of sulfonation, or the proportion of sulfonic acid groups which have entered the lignin molecule during the sulfonation process. The chemical formula for sulfonic acid groups is —$SO_3H$, in which the sulfur atom is combined directly with a carbon atom in the lignin or other organic material in the lignin-containing material sulfonated.

This type of sulfur is to be distinguished from inorganic sulfates or sulfites, sulfur dioxide free or loosely combined with the lignin and sulfur which might be bound with the lignin as a sulfate. The sulfonate sulfur or sulfur combined directly with carbon is a stably bound sulfur which is not removed from the lignin without drastic treatment such as with sodium hydroxide at high temperature and pressure. In speaking of the sulfur content of the sulfonated lignin-containing material, we refer to the total sulfur as the sulfur of all types which are determined by standard analytical procedures and to the sulfonate sulfur which is the sulfur stably bound with the lignin. The degree of sulfonation required to promote solubility and dispersive properties will vary somewhat with the source of the lignin being sulfonated, i.e., the conditions of pulping. However, sulfonated lignin, having sulfonate sulfur contents as low as those in the range 0.9–3.8% have been used successfully in making the dispersive additives of our invention. Products containing sulfonate sulfur in excess of these amounts do, of course, have the requisite solubility for use in accordance with the present invention.

By way of summary, the raw material for our process is a sulfonated lignin-containing material as it may be received from the blow pit of the bisulfite process or modification of said bisulfite process employing somewhat less acidity, for example and not limitation, about pH 4.5 instead of 1.5 or less, or other sulfonated lignin-containing materials such as those derived from neutral or alkaline pulping processes. Any of these may be in any one of a number of states or degrees of refinement, purification and concentration. We prefer, however, to use concentrated and fermented spent sulfite liquor from the pulping of wood with calcium bisulfite cooking acid because such material is already sulfonated, and is easily converted to other metal salts as disclosed hereinafter and is available in large quantities. By "fermented" is meant spent liquor from which carbohydrates have been removed by fermentation. In any event our starting material comprises a sulfonated lignin-containing material.

Our starting material may be refined and fractionated, but whether it is fractionated before or after treatment according to our invention depends on economical considerations and the special product desired.

Briefly stated, our novel compositions include additives produced by a process which in part involves converting acid heat treated sulfonated lignin-containing material to a salt of iron, chromium, copper, and aluminum, or combinations of said salts; or converting the refined acid heat treated sulfonated lignin-containing material to said salts; or converting the fractionated acid heat treated sulfonated lignin-containing material to said salts; or converting to said metal salts sulfonated lignin material subjected to other pretreatments, effecting improvement in properties for use in drilling mud, for example but not by limitation, by alkaline heat pretreatment as set forth in our copending application Serial No. 694,737, filed November 6, 1957, and pretreatment by steam stripping, gas or air blowing during heating of solutions of said sulfonated lignin-containing materials derived from spent wood pulping liquors.

Another feature of the invention comprises the use of drilling fluid additives prepared by a process which involves subjecting the acid treated sulfonated lignin-containing material containing said metallic salts to oxidation which brings about changes in the constitution of the solids of the sulfonated lignin-containing material resulting in additives of greatly enhanced properties comparable and superior to those of natural quebracho in the making of drilling muds.

Also, acid treated liquor containing the said metallic salts of dissolved fractionated components may be subjected to oxidation which brings about changes in the constitution of the fractionated solids of the sulfonated lignin-containing materials resulting also in additives of greatly enhanced properties comparable and superior to those of natural quebracho in making drilling muds. Our products are also superior in dispersing the ingredients of clay slips, cement, plaster, etc.

Another feature of the present invention comprises the use of drilling fluid additives prepared by a process which involves the oxidation of acid treated sulfonated lignin-containing material, regardless of whether the salt of iron, chromium, copper and/or aluminum is formed. We have found that such oxidized materials make substantial improvements in the effectiveness of thinning of lime base drillings muds. However, said products also provide substantial improvement, although to a lesser degree than is provided by combining oxidation with salt formation, in the case of fresh water drilling muds.

Generally stated the combination of our invention and discovery concerns the acid polymerization of sulfonated lignin-containing material such as spent sulfite liquor derived solids and contemplates the controlled heating of a water solution of the sulfonated lignin-containing material under acid conditions until a controlled degree of polymerization of the contained lignin sulfonic acid occurs, giving a substantial increase in molecular weight of the lignin sulfonic acid, short of substantial insolubilization thereof; and/or oxidizing said sulfonated lignin-containing material and/or forming a metal salt thereof having a metal ion selected from the group consisting of iron, aluminum, chromium, copper and mixtures thereof as is fully disclosed herein. It has been further found that in most instances a readily determinable increase in relative viscosity of the polymerized reaction product serves to correlatively identify the improved dispersive properties achieved by and characterizing our invention. In short, controlled polymerization of sulfonated lignin-containing material to a readily identifiable relative viscosity of the reaction and product short of substantial insolubilization in many instances consistently produces such improved properties. The extent or degree of completion of the reaction is also readily determinable, either alternatively or conjunctively, directly in terms of certain improved properties of the product such as its gel strength and water loss reducing capabilities in a test lime base drilling mud.

Considered somewhat more quantitatively, the present invention and discovery contemplates the heating of spent sulfite liquor derived solids at concentrations from about 10% or less to about 70% total solids by weight in aqueous solution, under acid conditions ranging from about pH 4 to about pH 0.2 and at a temperature above about 50° C., and as high as 170° C. or 180° C. or for a time ranging from about 15 minutes to several days, the conditions being selected so that a polymerization reaction occurs. In preparing a fresh water mud thinner, the starting material and acidic reagent are preferably selected to insure that no substantial amount of water soluble inorganic salt is present in the reaction or reaction product, and in any case, the time of reaction is controlled so as to produce polymerization of the contained lignin sulfonic acid only to a degree short of substantial insolubilization.

While a wide variation in solids concentration, pH, and time of reaction are possible within the scope of the present invention, consistent with the requirements that acid polymerization occur only to a point short of substantial insolubilization, it will be readily understood from our disclosure of the present invention and discovery that the degree of concentration of the solids and the comparative temperature level of the reaction are both quite significant, and the acidity of the reaction is also quite important in achieving the remarkable improvements in dispersive power of the product.

Selection of the prepared solids concentration range to fall between about 10% and about 70% has been based on the consideration that at concentrations below about 10% the rate of improvement in dispersing properties becomes so slow as to be of less practical significance, while liquor solids concentrations above 70% are so viscous as to not be handleable in a practical manner by use of existing commercial processing equipment. A furthere consideration limiting the practical upper limit insofar as solids concentration is concerned is the fact that the polymerization involved by virtue of the reaction tends to further increase the viscosity of the solution making it even more difficult to handle. But the operability of our process is not limited to any maximum solids concentration, given commercial equipment or technique by which the solution can be handled. Further, with regard to the lower limit of solids concentration, it has been found that improvement in thinning and water loss properties of the lignosulfonate occurs on heating under acid conditions at concentrations as low as 2.5% solids. The observed increase in molecular weight indicates that polymerization has occurred (see Example IX). The finding is contrary to a finding reported by a recent literature disclosure indicating that treatment of spent sulfite liquor derived solids at low concentration (about 4% solids) with acid does not cause polymerization but rather hydrolyzation of the lignin sulfonic acid and lowering of the molecular weight (see, for example, Felicetta, Vincent F., and McCarthy, Joseph L., "Molecular Weight of Lignosulfonates as Influenced by Certain Acidic Conditions," Journal of the American Chemical Society, vol. 79, page 4499). It should be noted that these authors were working with highly purified, high molecular weight, calcium lignosulfonates which might account for their results.

With respect to temperature of reaction, it has been determined that the higher the reaction temperature, the faster the reaction will proceed and the shorter will be the reaction time. With temperature above about 100° C., the reaction must of course proceed under super-atmospheric conditions, with the higher pressure as well as the higher temperature tending to promote a faster reaction rate. While higher reaction temperatures are more efficient in terms of requisite reaction time, it has also been determined that reactions at the relatively higher temperatures are more difficult to control. Accordingly, the selection of an appropriate reaction temperature under any given set of operating circumstances will involve somewhat of a compromise between desired reaction rate and desired degree to which the reaction is to be precisely controlled, in terms of reproducibility of reaction end product properties.

With respect to degree of concentration of the spent sulfite liquor derived solids in the aqueous solution in which the reaction time takes place, it has been further determined that the rate of the reaction is related to the concentration of the solids in the solution and that more superior improvements in properties result at relatively high solids concentrations. Also, the more concentrated reaction solutions permit relatively lower reaction temperatures. Thus, with 70% concentration of solids in the solution a reaction temperature even as low as 50° C., is operable to cause polymerization.

With respect to the acidity of the reaction solution, it has been determined that the lower the pH (the more acidic the reaction), the more rapid the reaction, and the lower permissible temperature, coupled with an attendant greater difficulty in terms of precise control of the reaction.

Thus, summarizing some of the generalized considerations respecting appropriate reaction conditions, it can be stated that superiority of end product properties will dictate as high a solids concentration as can be conveniently handled, as high a reaction temperature as can be practicably controlled, and as low a pH is economical and practicably controlled. Commercial practice of the invention then involves determination and selection of the most desirable reaction conditions within the approximate ranges set forth, and it will be readily understood that a relatively low concentration will normally be associated with a relatively high reaction temperature and/or reaction time, that a relatively low reaction temperature will normally require a relatively low pH, that a relatively short reaction time will require relatively severe reaction conditions in terms of high temperature and/or relatively low pH, and that optimum reaction time is to be compromised with optimum reaction control.

In a preferred form, the acid polymerization of spent sulfite liquor derived solids, according to the present invention and discovery, can be accomplished by heating at about 40% concentration of spent sulfite liquor derived solids in aqueous solution at about pH 0.8 (by addition of about 4% $H_2SO_4$), at a temperature of about 90° C. for a period of about 24 hours. Another preferred and very effective reaction under super-atmospheric conditions can be accomplished by reacting a 40% concentration of spent sulfite liquor derived solids in aqueous solution at about pH 1 (by addition of about 4% $H_2SO_4$), at a temperature of about 140° C. under autoclavic, continuous flow conditions for a period of about one hour.

In terms of the drilling mud thinning and water loss control characteristics of our reaction end product, the desirable improvements by acid polymerization of spent sulfite liquor derived solids have been determined to most significantly occur when the relative viscosity of the reaction end product, as measured in 10% aqueous solution, at pH 4.0 has increased to about 1.4 to 4.0, short of substantial insolubilization. It has also been determined that a preferred intermediate range of relative viscosity reflecting remarkable dispersive properties of the reaction end product for drilling muds occurs when relative viscosity of the reaction end product as measured in 10% aqueous solution at pH 4.0 is raised only to about 1.4–3.0, without substantial insolubilization. Further, as regards dispersing effectiveness in drilling muds, it has been determined that the ideal point at which to interrupt the polymerization reaction characterizing the present invention and discovery is when the relative viscosity of the end product as measured in 10% aqueous solution at pH 4.0 reaches about 1.6–1.8. As regards water loss control characteristics, it is determined that improvement generally follows the improvement in dispersive properties and continues up to the point of substantial insolubilization. Soluble products resulting from polymerization beyond the point of most effective dispersing characteristics are useful as water loss control agents in combination with dispersants which are not effective water loss control agents. Materials such as starch and carboxymethyl cellulose are used extensively in drilling muds for this purpose.

It will be observed that in all situations, the reaction of the present invention and discovery is interrupted before polymerization of the lignin sulfonic acid has proceeded to substantial insolubilization. This consideration has been determined to be critical, according to the present invention and discovery, because if the acid polymerization is permitted to go to completion or even to the point of substantial insolubilization of the reaction product, the resulting reaction product when used as a dispersing agent in clay-water suspensions has comparative ineffectiveness when used in customary quantities for such additives. In this respect, it is theorized that polymerization to the point of substantial insolubilization results in such large molecules that the requisite number of molecules to form an effective dispersive film are simply not present in a clay-water dispersion when a customary amount of dispersing agent is used. An alternate theory in this regard is that polymerization to the point of substantial insolubilization results in relative chemical and/or physical inactivity, insofar as formation of the requisite dispersive film. In any event, data demonstrating effectiveness of the present invention as to selection of a reaction product evidencing the above indicated range relative viscosity short of substantial insolubilization shows remarkable superiority in terms of dispersive effectiveness when the reaction product of the present invention and discovery is used in normal amounts as a dispersing agent in clay-water solutions, particularly drilling muds.

For purposes of the present invention, the terms "short of substantial insolubilization," "substantially entirely water soluble," and "water soluble sulfonated lignin" contemplate the presence of less than about 5% organic insolubles in the reaction product, tested in the manner hereinafter set forth.

As is indicated herein, the initial raw material for our process any sulfonated lignin-containing material may be used whether the material contains calcium, magnesium, sodium, ammonium or other water soluble salts of the lignosulfonate. The material may be acidified with sulfuric acid and the reaction product neutralized with lime thereby removing the sulfuric acid as insoluble calcium sulfate, or for specific uses where a salt is not objectionable other acids may be used. For example, if the product is to be used as a drilling mud thinner for calcium chloride inhibited muds, hydrochloric acid could be used for acidification and the product, when neutralized with lime, would provide both thinner and calcium chloride for the mud system. Another procedure for acidification would be to filter the spent sulfite liquor through a bed of ion exchange resin in the hydrogen form. Because of the low cost and ease of obtaining a product relatively free of soluble inorganic salts sulfuric acid treatment is most satisfactory for the process and product of our invention. Another method of obtaining an acid reaction mixture is to add to the calcium base spent sulfite liquor an acid salt such as iron, chromium, copper or aluminum sulfate. By this procedure, the calcium sulfate is precipitated and separated from the liquor and an acid salt of the lignosulfonate is obtained which can be heated as such or further acidified with a strong acid such as sulfuric acid and then heated.

As indicated above, the acidic reagent preferred for the acid polymerization contemplated by the present invention and discovery is sulfuric acid, preferably of 4-20% concentration. It will be evident, however, that other acids, such as phosphoric acid and oxalic acid are also suitable for general applications since their calcium salts are water insoluble and since they have the capability of establishing the requisite hydrogen ion concentration. Acetic acid, as well as hydrochloric acid, can be used where inclusion of soluble salts of inorganic bases, particularly calcium salts, is not objectionable. Sulfuric acid is preferred, however, because of the relatively low cost and the insolubility and ease of removal of the formed calcium sulfate.

In making the salts of iron, aluminum, copper, or chromium of sulfite which for the production of an oxidized salt, can be done either before or after oxidation, we prefer to use the sulfates of these elements for this purpose because with calcium base sulfite liquor, calcium sulfate precipitates so that it may be removed and thereby bring about purification of the product. Higher temperatures promote the growth of larger crystals of calcium sulfate which are easier to separate from the liquor, hence it is desirable to hold the liquor after addition of the sulfate at 90°-95° C. for a period of time. The formation of large crystals is also fostered by the interaction of the salt with the spent sulfite liquor solids in such a manner that the precipitation of the calcium sulfate occurs more slowly. This objective can be accomplished by using more dilute solutions and/or using lower temperatures during the base exchange reaction. Hence, a preferred method of forming the iron, chromium, copper, and aluminum salts is to carry the reaction at 30°-50° C. and then to heat the solution with agitation to 90°-95° and hold this temperature for one hour or longer. The reaction mixture is usually acidic during this stage so that this latter treatment is also an acid treatment and has beneficial action on the properties of the spent sulfite liquor product.

Aluminum sulfate may be added preferably in proportion equivalent to the base (i.e., calcium, sodium, magnesium and ammonium) already present in the spent sulfite liquor or it can be used in smaller or greater proportions. Furthermore, aluminum sulfate may be added in anhydrous form or as any of the hydrates of commerce, such as paper makers alum (17% $Al_2O_3$) or as $$Al_2(SO_4)_3 \cdot 18H_2O$$

In making the lignosulfonate salts, we have used aluminum sulfate salts in the proportion of 1% to 50% by weight of the spent sulfite liquor solids. With the other salts, i.e., iron, chromium and copper, the range of permissible addition is about the same, i.e., 1% to 50%. For example, copper requires the addition of about 30% of $CuSO_4 \cdot 5H_2O$ for complete base exchange as compared with about 26% of 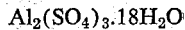 which takes into consideration the usual chemical equivalence. However, good results have been obtained in using from 15% to 30% of aluminum sulfate ($Al_2(SO_4)_3 \cdot 18H_2O$). The same observation applies to the use of iron, chromium, and copper salts.

In addition to adding sufficient of the cations to be equivalent to approximately the base present in the sulfonated lignin-containing material, it is our unusual (and unexpected) discovery that an excess of the cation over the chemical equivalent for base exchange improves the effectiveness of the product of our invention and discovery, particularly in respect to the conditioning of fresh water mud in connection with obtaining the lowest possible values for yield value and 10 min. gel and water loss. Thus in the preparation of fresh water muds, we prefer to add an excess of a sulfate salt having a cation selected from the group: iron, aluminum, copper and chromium, or mixtures thereof. Since these salts occur as hydrates with varying amounts of water, the permissible addition of these salts to the mud is more definitely expressed as an amount of the sulfate salt equivalent to the anhydrous form of that salt. Thus in terms of the anhydrous forms, the permissible addition is about 1% to 80% by weight of the sulfonated lignin, in excess of the amount of sulfate salt necessary for the base exchange. Thus, for example, with the ferric sulfate the optimum results are obtained with a total addition of the sulfate salt of about 40% to 50% by weight of the sulfonated lignin, which, on the anhydrous basis, would be about 35% to 42% by weight. Accordingly, the excess over the amount for chemical equivalence on the anhydrous basis is about 20% to 27%. Ferrous sulfate and the sulfates of aluminum, chromium and copper perform in the same manner and the excess addition over the chemical equivalent on an anhydrous basis is also about 1% to 80%. Mixtures of these sulfate salts can be used for this purpose. Copper has the advantage of imparting antiseptic properties to the additive, to preserve the mud which may be subject to micro-biological attack, particularly so when starch is present.

In regard to the permissible addition of excess sulfate salt the disclosure above of 1 to 80% by weight of the anhydrous sulfate salt pertains to the salt and not to the oxidized salt. For the latter the permissible addition is somewhat less than 70%. Accordingly, from the standpoint of commercial practicability, as applied to both the salt and the oxidized salt, an excess of 1 to 50% of the anhydrous sulfate salt on the basis of the sulfonated lignin is preferred.

In forming the said salts of the sulfonated lignin-containing material, it is preferable to have the latter in the calcium condition, that is, as a calcium salt so that when the sulfate salts of iron, aluminum, copper and chromium are added, the base exchange reaction occurs and calcium sulfate forms which can be removed, thus yielding an essentially pure form of the desired salt.

The disclosure above relating to the permissible addition of 1 to 80% pertains particularly to sulfate salts, or any salt of said metals the anions of which form insoluble salts with calcium, for example, oxalates. However, any soluble salt of these metals could be added to a solution of the sulfonated lignin-containing material without the formation and/or removal of a precipitate. The anion in said soluble salt may be any of the common anions such as, chloride, nitrate, formate, etc., although higher concentrations of chloride ions and to a lesser extent nitrate ions become deleterious above the concentration equivalent to the base exchange capacity of the sulfonated lignin. Continuing then, when such a solution is brought to dryness, because of the ionic equilibrium in the solution, a mixture of salts is obtained. Thus, an amount of the desired lignosulfonate salt, for example, iron, would be present in the product, together with the base (sodium, magnesium ammonium, etc.) which was originally in the sulfonated lignin-containing material. This product would not be as efficient as the product in which the original base in the sulfonated lignin-containing material was removed prior or on addition of the iron salts. However, in cases where the sulfonated lignin-containing material has the base sodium, magnesium or ammonium present instead of calcium, it may be satisfactory to make the partial salt in the aforesaid manner. This could be the case, for example, with sulfonated lignin from the kraft and soda processes which usually contains sodium as the base by reason of the steps of its manufacture.

When an excess of a soluble inorganic salt (including salts such as formates and oxalates under the designation inorganic) of iron, chromium, aluminum, or copper over and above the stoichiometric equivalent of the sulfonated lignin is added in preparing the product of our invention, and the added anions are not subsequently removed, a product is obtained which is less efficient as a thinner but nevertheless is effective. The lower efficiency results from (1) dilution of the thinner by the soluble inorganic salts, and (2) a thickening of the mud resulting from the small amount of soluble inorganic salt added to the mud as a component of the thinner product. Thus, the thinner product with the excess appears to be inefficient when used in small amounts but when large amounts of said thinner product is added to the mud, the surprising resistance of the sulfonated lignin metal complex to the salt contamination overcomes the effect of the small amount of inorganic salt.

The salt contamination effect may be illustrated by considering the combination of one part of ferric chloride with 2 parts by weight of thinner additive of our invention. This combination would amount to 50% of excess of ferric chloride. Adding 9 pounds per barrel of this combination to the drilling mud gives a chloride concentration in the mud approximately equivalent to 3 pounds per barrel of sodium chloride or about 1% of said chloride and a thinner additive concentration of about 6 pounds per barrel. A mud contaminated with 1% salt (sodium chloride) is readily thinned by 6 pounds per barrel of the thinner additive.

The amount of metal for complete base exchange will depend on the concentration of acidic components in the sulfonated lignin-containing material and in particular the concentration of the sulfonated lignin. By way of example and not limitation fermented spent sulfite liquor solids having a sulfone sulfur content of about 6% will require about 5% of iron for base exchange. The addition of 50% excess anhydrous ferric sulfate over that required for base exchange is equivalent to about 14% of iron.

When magnesium, or sodium bisulfite cooking liquor instead of calcium has been used in manufacturing the pulp, it is then desirable, but not absolutely necessary, to eliminate or partially eliminate the magnesium, ammonium, or sodium ions prior to making the iron, chromium, copper, or aluminum salt. This situation can be brought about by converting to the calcium salt before proceeding with the process of our invention, or it can be accomplished by any number of procedures well known to those skilled in the art—for example, by ion exchange, dialysis with addition of acids, and base exchange procedures in general. For example, cations (i.e., magnesium, ammonium, or sodium) may be removed by passing the liquor through a cation exchange column in the hydrogen state, and then treated with an oxide or hydroxide of iron, chromium, copper, or aluminum. We prefer to have the lignosulfonate in the form of the calcium salts before making the iron, chromium, copper, and aluminum salts because the salts are obtained with less contamination in this manner by reason of the calcium sulfate being precipitated so it can be removed—but note well, such purified products can be obtained by any procedure known to the art for making the conversion to the desired salt as well as those named immediately above.

An example of partial salt formation comes as a result of the oxidation treatment with sodium or potassium dichromate as a result of the fact that chromium salts are a product of the reactions involved. Any soluble chromium salts thus formed will provide chromium ions which will be in equilibrium with the calcium ions associated with the sulfonate group of the lignosulfonate. Thus, a partial chromium salt of the lignosulfonate in essence will be formed which would tend to impart the properties attained if the calcium were removed and the lignosulfonate salt were wholly chromium salts. If, furthermore, an excess over the amount of sodium dichromate necessary for the base exchange, i.e., about 12% of sodium dichromate, is added, additional chromium ions resulting from the reduction of the dichromate are present which tend to drive the reaction in the direction of the formation of the chromium salt of the lignosulfonate so that this excess would have somewhat the effect of removing the calcium or in other words, forming a chromium salt instead of the calcium salt of the lignosulfonate. The addition of excess sodium dichromate, would also result in an excess of chromium salts formed by the reduction of the dichromate and would have somewhat the effect of the addition of an excess of chromium sulfate over that necessary to make the base exchange. This method of forming the salts, however, does not yield a product which is as effective for mud formulation as the methods previously described where calcium is removed, for example as the sulfate or otherwise, because calcium ions cause thickening of drilling mud and because of the miscellaneous reaction products. However, the effectiveness of agents made in this manner can be improved by removing the calcium during the treatment, for example, by adding sulfuric acid or any other acid whose anion forms insoluble salts with calcium or by addition of suitable salts which form insoluble compounds with calcium such as sodium sulfate. This illustration is mentioned by way of example that an improvement can be obtained by the presence of an excess of chromium, aluminum, copper, iron salts or combinations thereof, even though there is an equilibrium mixture present with other ions, such as potassium and sodium, but is not given to indicate a preferred method of operation.

It should be noted that an excess of sodium ions resulting from excess sodium dichromate addition is not seriously harmful since the drilling mud clays are also sodium salts and the additional sodium ions introduced into the mud by the additive are relatively few.

The iron, chromium, copper, and aluminum salts of the lignosulfonates thus formed are useful as drilling mud thinners in muds which do not contain an excess of lime, i.e., fresh water muds, and these products are thereby distinguished from the spent sulfite liquor products previously used as thinners in the so-called lime base muds. These previous lignosulfonate thinners which may be ammonium, sodium, magnesium, or calcium salts of lignosulfonates are operable only in the lime base muds and are not effective in muds which are sometimes termed fresh water muds, i.e., muds of low pH and which do not contain salts of aluminum, iron, copper, and chromium—the inclusion of said salts being a part of our invention and discovery. The aluminum, iron, copper, and chromium salts of the spent sulfite liquor on the other hand are effective in varying degrees over the whole pH range of the fresh water muds and are also operable as thinners in lime base muds.

Furthermore, let it be noted that another alternate pretreatment may be used whereby the hot spent sulfite liquor is acidified and air blown or treated to remove the sulfur dioxide and then oxidized with the agents described below. By this course the spent sulfite liquor is purified of sulfur dioxide, and apparently the structure of the components of the spent sulfite liquor is modified and the oxidizing agents if later used are conserved for performing their special functions.

As heretofore indicated an important feature of our invention and discovery is that the oxidation of spent sulfite liquor components leads to increased activity or enhanced properties of said components respecting dispersing properties, and that these changed properties are manifested in the thinning of the viscosity of clay suspensions and also in the reduction of the gel-like properties of such suspensions. We have found that most oxidizing agents are operable in varying degrees as to the improvement produced. Particularly effective for this purpose are the following: hydrogen peroxide, ozone, lead dioxide, chromic acid, chlorine, alkali and alkaline earth hypochlorites, alkali metal chromate, alkali metal permanganate, alkali metal persulfate, alkali metal perborate, and electrolytic oxidation. These several agents are the preferred oxidizing agents.

The preferred forms of the oxidizing salts such as chromates, permanganates and persulfates are the sodium and potassium salts, but the ammonium salts may also be used and where available are included in the descriptive term "alkali metal salts."

When chromate is used for oxidation of spent sulfite liquor, the chromate is added preferably as sodium dichromate, since this form is the most readily available in commerce, and in subsequent discussions the chromate addition is referred to as dichromate. However, it is well known that in aqueous solution chromate ions ($CrO_4^{--}$) and dichromate ions ($Cr_2O_7^{--}$) are readily interconvertible, depending on the pH of the solution. In strongly acid solution, the dichromate ion predominates, but on neutralization with alkali the dichromate shifts to the chromate. Equilibrium is readily reached between the two forms, depending on the pH of the solution. Therefore the chromate may be added as either chromate or dichromate.

Further in regard to oxidation with chromium compounds: By experiment, we have discovered that oxidation of fermented spent sulfite liquor solids with sodium chromate at pH 8 provides a product which has substantially the same thinning effect on the drilling mud as a product obtained by oxidation with sodium dichromate at pH 4. In making this experiment both products were converted to the iron salt to make the mud test. Furthermore chromic acid may be used instead of the chromates in which case it is usually necessary to add sodium hydroxide to neutralize the product to about pH 4 to 5 prior to drying. All of these chemicals, i.e., sodium chromate, sodium dichromate and chromic acid give oxidized products, the iron, aluminum, copper and chromium salts of which are effective thinners for both lime and fresh water muds and give substantially similar results.

One method of obtaining oxidation is by electrolysis whereby oxidation takes place at the anode of an electrolytic cell. We have found that effective electrolysis can be obtained in a simple cell with or without a membrane to separate the anode and cathode, and improved products have been obtained with current usages from a desired effective amount up to about 5 ampere hours or more per gram of sulfonated lignin-containing material. It will be understood that the amount of impurities or contaminants, including carbohydrates and sulfur dioxide, in the sulfonated lignin-containing material electrolyzed, will change the electrical current consumption (i.e., amperes hours per gram of said sulfonated material) to obtain a given desired result. Thus we have found that from about 0.2 to 5.0 ampere hours per gram is suitable for fermented spent sulfite liquor but less current consumption will be necessary for more purified sulfonated material while greater current consumption may be necessary for less purified sulfonated lignin-containing material.

The electrolysis should be conducted under conditions which will bring about oxidation and not reduction. For this purpose a non-reactive anode, that is, an anode which does not dissolve substantially during the electrolysis, should be used. Thus platinum is suitable. Also, it is preferable to carry on the electrolytic oxidation prior to forming a lignosulfonate salt of the metal iron, aluminum, copper and chromium. However, if the salt is formed before electrolysis, any metal lost for example by plating on the cathode should be replaced, that is, the equivalent of such lost metal should be readded to the electrolyzed solution. This loss of metal ions may be substantially eliminated by electrolyzing under acid conditions of below about pH 3, or as stated above, by electrolyzing before forming the said salt.

Oxidation by addition of sodium perborate results in contamination of the product with sodium borate which must be removed to obtain the greatest efficiency of the product. One method of purifying the product is to remove the resulting borate ions as calcium borate which readily occurs if the starting material is a calcium salt of sulfonated lignin-containing material. The sodium perborate has an alkaline reaction and raises the alkalinity of the solution sufficiently to make calcium borate insoluble. The calcium borate may be removed by filtering or settling. Other methods known to those skilled in the art can be used for such purification. As set forth herein, chlorination also results in by-products of the reaction which should be removed by purification to obtain more effective products for drilling mud thinning.

In regard to the choice and use of oxidizing agents for practicing our invention, two factors are of prime importance: The strength or power of the oxidizing agent and the quantity of oxidant being used in proportion to the organic solids being oxidized. The strength or intensity of the oxidizing agent is expressed as an oxidation-reduction potential, and tables of these potentials are available in the chemical literature. We have found that the oxidizing agents which are suitable for carrying out our invention have a range of oxidation potentials greater than −1.3. The quantity of oxidant which is used to bring about the desired result may be expressed as the weight in grams of each oxidant which can be used per 100 grams of sulfonated lignin-containing material.

The amount of oxidant required depends on the specific oxidant being used, the nature and purity of the sulfonated lignin-containing material being treated and the conditions under which the treatments are conducted. In general and for practical operation, particularly respecting cost, 1% to 50% by weight of the several oxidants on the basis of the dry sulfonated lignin-containing material is all that is required to produce the desired result. However, when the oxidant is of a less concentrated character, as in the cases of alkali persulfate and perborates, both being costly, a large percentage of such oxidant is required to obtain the desired result. In any case, the reaction should be conducted in such a manner and with concentrations and proportions of the reactants so that gelation of the solution does not occur and a permanently soluble product is obtained. Solubility of our additive product is a fundamental requirement because the product is to be added to a drilling mud system, one component of which is water in which the additive product must dissolve to function as a thinner. Also, the dissolving brings about the distribution of the agent uniformly throughout the medium which increases the effectiveness of the product.

By way of explanation gels contain some occluded water soluble product and to the extent that the water soluble component is available or the gel dissolved in the medium said gels function somewhat as thinners. If any thinning action occurs with gelled (i.e. insoluble) products, such thinning is deemed not to be due to the gel functioning as a surface active agent but is due to the soluble component accompanying the gel. At higher pH, i.e., above about 9, the unwashed gelled products dissolve to some degree and show some tendency to thin the mud. Particularly is this true if the dissolved component is not washed out. In any case gels are not desirable because the material is less efficient.

Permanently stable solutions without gelation as shown in the examples may be obtained by conditions which slow the rate of reaction and keep the reactants in low concentration in relation to each other. Furthermore, other conditions affecting the formation of gels in more or less degree are the degree of sulfonation, the concentration of the sulfonated lignin containing material, temperature, concentration of the oxidant, pH and effectiveness of mixing. In addition, the character of the sulfonated lignin containing material being treated affects the amount of oxidant being used, in particular, the degree to which the materials have been previously purified, especially of reducing substance such as sulfur dioxide and carbohydrates, and/or fractionated. The degree of sulfonation is important in regard to water solubility. Also, we have discovered that the molecular weight, and apparently the molecular weight distribution within the fraction will affect the quantity of oxidant required to bring about the desired result. By way of example and not limitation, when a 45% to 50% solution concentration of fermented spent sulfite liquor solids is being used as much as 15% or more of hydrogen peroxide may be added, whereas, with potassium permanganate or potassium dichromate, such concentration of spent sulfite liquor thickens rapidly to a gel when about 10% of these agents is added. Furthermore, by way of example to show the effect that the prior history or character of the spent sulfite liquor has on the quantity of oxidant which may be used without causing gelation, when a caustic treated fermented spent sulfite liquor as described in Example II is used at pH 4, about 8% of sodium dichromate will cause gelation at 42% total fermented spent sulfite liquor solids, 15% of sodium dichromate will cause gelling at 25% solids and 21% of sodium dichromate at 12% total solids, the dichromate in each case being added as a 25% solution in water at 60° C. Let it be noted that the above percentages are based on the weight of the dried fermented spent sulfite liquor solids being treated. Moreover under other conditions, even more of this oxidant can be added without causing permanent gelation or loss of water solubility. Purification and molecular weight are other factors which bring about gelation with different proportions of the oxidant. For example, using a solution of 45% to 50% total solids, about 4% by weight of the solids of the oxidant will gel the purified high molecular weight lignosulfonates at a pH of less than 4.5, whereas, as much as 8% or more of potassium permanganate or sodium dichromate may be added to the low molecular weight lignosulfonate fractions of the same concentration without gelation. But substantially larger concentrations of sodium or potassium dichromate may be added if the reactants are dilute. For example, a low molecular weight lignosulfonate fraction (40% of the total original fermented spent sulfite liquor solids) containing 17% of reducing substances expressed as glucose as a 2.5% solution in water treated at room temperature with 50% by weight of sodium dichromate as a 2.5% solution at a pH of 3 yielded after drying at room temperature a product which was slowly soluble in water. With 40% by weight of sodium dichromate the product was rapidly soluble in water. During such reactions the pH rises and acid such as sulfuric may be added to maintain the desired pH. The reaction under the above conditions was substantially complete in one hour. Thus the objective, namely a water soluble oxidized product, can be obtained with up to 50% by weight of the dichromate oxidant depending on the conditions used in the reaction. Similar results are obtained with potassium and sodium permanganate. The other oxidants which are less subject to providing insoluble products may also be used up to 50% and more by weight of the sulfonated lignin-containing material depending upon said conditions.

PILOT TESTS

We have discovered that the oxidants which are suitable for oxidizing the sulfonated lignin-containing material may be roughly divided into two groups: Those containing the metal ions chromium and manganese, i.e., the alkali metal chromates and the alkali metal permanganates and those involving gaseous oxidation components, such as hydrogen peroxide, sodium persulfate, sodium perborate and chlorine and, accordingly, different tests were originally necessary in establishing the maximum amount of the oxidant which could be used for any particular sulfonated lignin containing material.

The maximum amount of oxidant particularly the chromates and permanganates which can be used with any one sulfonated lignin containing material can be determined by the following pilot test. A dissolved sample of the sulfonated lignin containing material is diluted to 2.5% solids, acidified to pH 3.0 with sulfuric acid for this particular test and various amounts of sodium dichromate added, together with sulfuric acid to maintain pH 3.0. The solutions are then allowed to stand about 1 hour at room temperature, adding sulfuric acid at intervals to maintain pH 3.0. At the end of 1 hour, the sample is heated to 80 to 90° C. and digested at this temperature for about an hour. The product samples are then dried at 60° C. and tested for solubility in water. The highest amount of dichromate giving a soluble product is the maximum limit of the amount of oxidant that can be used.

Another guiding test as to the maximum quantity of oxidant which may be used with any one sulfonated lignin containing material in forming the products of our invention and discovery is an evaluation of the performance of the product as a thinning agent for drilling mud. To apply this test, a solution of about 10 grams of sulfonated lignin containing material dissolved in 10 cc. of water is treated with 2 grams of ferric sulfate to convert the lignosulfonate to the iron salt, the solution heated to 80° C. and centrifuged to remove calcium sulfate. This solution is then treated with various amounts of the oxidant being tested at a pH of about 3 to 5 for this particular experiment and heated at 80°–90° C. for about 1 hour and then dried at 60° C. The product is tested for solubility in water, as above, and then for mud thinning properties as described herein. If the properties of the base mud are not improved by the addition of the product, then too high a concentration of that particular oxidant was used in the oxidation stage.

In using the oxidizing agents which envolve a gas in the oxidation process, such as hydrogen peroxide, chlorine or sodium persulfate, a greater amount than that equivalent to sodium dichromate or sodium permanganate is required, since the use of such agents involves a more rapid deterioration and possible escapement of gas without complete reaction. It is probable also that the polyvalent metals manganese and chromium contribute to the effectiveness of the final product and these are not present in said other oxidants. Therefore, while the equivalent proportions are a guide to the relative amount of oxygen that can be used, they are not exactly equivalent in regard to the improvement which equivalent amounts of each of the oxidants will produce in the product.

Optimum thinning properties appear to be attained with sodium dichromate usages which give solutions well removed from the point of gelation. For a fermented spent sulfite liquor, of 40% to 45% total solids, the preferred amount of oxidant is about 7% to 9% of sodium dichromate based on the spent sulfite liquor solids for overall performance respecting the several properties required in drilling mud, but especially low water loss characteristics have been observed with about 18% of sodium dichromate. On the other hand, with chlorine which is considered an oxidizing agent herein, substantially more than the other agents can be added because some of the chlorine reacts by substitution with the spent sulfite liquor components, so that additional chlorine is required to bring about the desired oxidation results.

The time and temperature of the reaction is important in that the reaction should be allowed to go essentially to completion and the product should be substantially free of gels. It is preferable that the oxidation be controlled to yield a solution which can be dried to a powder which can be redissolved in water. If the oxidation is too severe the solution may gel or the dried solids may not be water soluble. Potassium permanganate and potassium dichromate are very rapid in their action and usually the oxidation is complete in 5 to 20 minutes and thereafter the solution is stable and shows no visible evidence of change on standing. If 10% of these agents are added as a 25% solution to concentrated liquor of greater than 40%, the spent sulfite liquor will gel in 15 minutes at room temperature, or if the solution is hot, the gelation will occur almost immediately. Solutions more dilute in organic solids, permit the addition of higher percentages of these oxidants. With milder oxidants, such as hydrogen peroxide, 15 minutes to 24 hours are necessary to bring about the completion of the oxidation. The temperature is usually a matter of choice and convenience but should be such that the reaction is complete in the time provided, although lower temperatures will give less difficulty with local formation of gels.

The concentration of the spent sulfite liquor can be any concentration up to 70% by weight of solids, but it is desirable to have the concentration of the liquor low enough to promote homogeneous reaction and prevent subsequent gelation. However, for practical reasons, it is preferred to use solutions of as high concentration as possible and, preferably, of the order of 40 to 50% solids concentration. For this reason, the dilute solution of the oxidant is added to the cool spent sulfite liquor solution of 40 to 50% solids with intensive mixing and after the reaction has been more or less completed, the solution is heated to the temperature at which drying will be conducted.

Thus, it is clear that, because of the choice of oxidants involved in providing required properties, the varied nature of the sulfonated lignin containing material, and the many factors involved in the physical conditions under which the reactions can be conducted, and also the many well known types of equipment used in mixing the reactants, that is not feasible to set forth the exact operating conditions for each product of production. Furthermore, the factor of what mud property is most desired must be considered since the properties do not respond in a parallel manner to all treatments. That is, sometimes all the properties may be improved whereas in some cases only one of the properties may be improved. Accordingly, a selection must be made to obtain the desired result. But many examples are given in the herein disclosure which will enable persons skilled in the art to select conditions of treatment best suited to the particular requirement of the case in hand. But for most cases for use in the field the oxidants can be used in the concentration of 1 to 50% by weight of the organic solids as herein disclosed and thereby obtain a fully reacted and soluble product without gelation. The determination of the maximum amount of any given oxidant which can be used for any particular sulfonated lignin-containing material is determined by pilot tests as hereinbefore described. But the usage is one depending upon which mud property is most desired.

Special processing is necessary when chlorine is used as the oxidizing agent since in addition to oxidation and any other reactions which occur, there is a reaction of chlorine with the sulfite liquor components, and there are by-products from the reaction such as hydrochloric acid, which if left in the product may have a deleterious effect. For example, it has been found that on the addition of 1% to 4% of chlorine on the basis of the dry weight of the spent sulfite liquor solids, the properties of the sulfite liquor residue improve even without further purification to remove the end products formed, such as calcium chloride. The chlorination can be increased up to the addition of 45% of chlorine above which the chlorinated lignin tends to become insoluble in the strong hydrochloric acid and calcium chloride solution formed in which case it is necessary to further refine the products by removing the hydrochloric acid and reaction products. One of the best methods of accomplishing this purpose is to precipitate the chlorinated lignin with lime. This treatment has additional benefit of purifying the lignosulfonates not only of the hydrochloric acid and its end products, but also of the carbohydrates themselves. In this connection we have discovered that, whereas with regular spent sulfite liquor it is difficult to divide the lignosulfonates into several fractions by treatment with lime, surprisingly with the chlorinated lignins of our invention and discovery, the products can be divided very readily into fractions of different average molecular weight. This finding has been of extreme usefulness in the preparation of specific fractions of the chlorinated lignin as to molecular weight.

It has been known that lignosulfonates may be precipitated in mass from spent sulfite liquor by adding at one time relatively large quantities of lime slurry until a pH of 11–12 is reached. It is our discovery that the lignosulfonate can be precipitated and recovered as fractions of different molecular weights by adding the lime in small increments. Especially surprising and useful is our discovery that if the lignosulfonates are treated with chlorine then they may be more readily divided by lime precipitation into many small fractions, while at the same time purifying the lignosulfonates from the carbohydrates, chlorides, and other miscellaneous components of the sulfite liquor. The oxidized and chlorinated lignosulfonates, fractionated as to molecular weight by lime, may then be used as such as lime base mud thinners, or they may be converted to aluminum, iron, copper, and chromium salts and as such they also make highly effective fresh water drilling mud thinners. Such oxidized and chlorinated lignosulfonates may be converted to other salts such as sodium, magnesium, ammonium, etc., if calcium is objectionable in the product. Fractionation of the chlorinated spent sulfite liquor can also be accomplished by the alcohol fractionation process according to the disclosures of the copending application of Adolphson Serial No. 703,664, filed December 18, 1957.

In summary, our invention comprehends the discovery that oxidation with or without forming a salt of a metal selected from the group of iron, aluminum, copper and chromium of the acid polymerized lignin sulfonate-containing material provides an improved drilling fluid, and that the amount of oxidation can be greatly varied.

The oxidized products are useful as thinners, and this is particularly important because products can be prepared from the acid polymerized spent sulfite liquor merely by a simple oxidation process to give products equivalent as thinners to those prepared by more complex and expensive procedures. Furthermore, let it be particularly noted, essentially in precipitation and fractionation procedures only a part of the spent sulfite liquor solids are available for use as mud thinners while, in contrast, our invention and discovery makes use of substantially all of such solids. This point is important where yield and costs are of prime consideration.

In general, the products of our invention and discovery may be prepared from spent pulping liquor and the solids therein in the condition as received directly from the digester, or said products may be prepared from modifications of the said solid components of the spent pulping liquor. Such modifications may be provided by various treatments but, nevertheless, the resulting solids still do constitute soluble sulfonated lignin-containing materials. By way of example and not limitation the treated solids may be as follows: They may be as they exist after fermentation of spent sulfite liquor whereby the carbohydrate content is reduced or they may be as solids after hot spent sulfite liquor is acidified and air blown; or they may be obtained as set forth in U.S. application Ser. No. 391,116, which briefly states ". . . the spent sulfite liquor treated with an inorganic base, for example sodium hydroxide, in developing a final pH of 7–10, the same may be heated at 40° to 120° C. for a period of 30 minutes to 2 weeks, the solid organic components being maintained in solution throughout the said reaction period"; or the spent sulfite liquor may be essentially freed of carbohydrates and extraneous material by any one of a number of procedures, preferably by fermentation or by adding increments of lime, or by precipitation, dialysis, separation by organic solvents, and/or organic bases, or precipitated as basic lignosulfonate for example with lime, or by salting out with salts such as calcium or sodium chloride.

Furthermore, the spent sulfite liquor components may have been derived by the pulping with agents other than the usual magnesium, sodium, ammonium, and calcium bisulfites. These other agents disclosed herein are iron and aluminum bisulfites.

Oxidation treatment improves the spent sulfite liquor components in providing a more effective lime mud thinner or more effective thinning and dispersing action in general, i.e., in both lime base and fresh water muds.

Base exchange to form iron, aluminum, chromium, or copper salts enhances fresh water mud thinning properties, and improves some of the lime mud properties, as for example a base exchange with aluminum sulfate will yield a product with lower viscosity and gel characteristics in lime mud.

SPENT SULFITE LIQUOR FROM BLOW PIT AND WITH OPTIONAL TREATMENTS

Fermented and/or Purified and/or Fractionated and/or Concentrated to 20%–70% Solids (or preferably concentrated to 30%–50% solids)

ACID TREATMENT AS DISCLOSED HEREIN

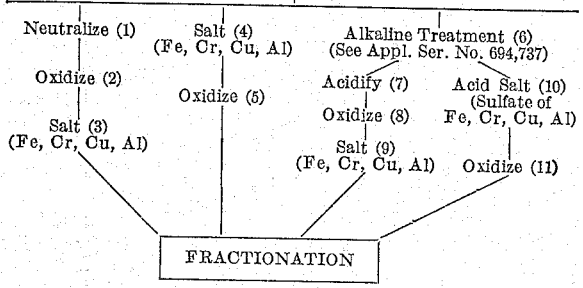

Manifestly, if the starting material was either raw spent sulfite liquor as it comes from the blow pit or if it was fermented spent sulfite liquor without further purification or fractionation, then any of the products of our invention as set forth in the above outline of the possible manifold treatments within our invention, may be further purified or fractionated by adding small increments of lime as herein disclosed or by solvent fractionation, application Ser. No. 437,833, filed June 18, 1954, and now abandoned in favor of U.S. Serial No. 703,664. Let it be noted that fractionation of the spent sulfite liquor provides for selection of fractions to yield desired properties in the additive formulated as disclosed herein.

Thus, to follow through in detail, the starting material may be, as previously discussed, either the spent sulfite liquor solids as contained in the spent liquor as received from the blow pit, or these solids refined in various manners, such as by fermentation, lime precipitation, fractionation, etc. In any case, the solids to be treated are preferably concentrated to 30% to 50% solution. The method of operation of this invention is to add an acid, or a salt bringing about an acid condition, to provide a pH less than about 4, and heat for example for 1 to 2 hours or longer at 95 to 100° C. At this point, if calcium sulfate is precipitated, it may be separated, depending on the purity desired in the final product. Said acid treatment may be carried out at less than about pH 4 at temperatures from 50° C. to 180° C. as more fully set forth previously herein and in the following examples.

The method of operation of this invention is set forth in the above outline as follows: This product can be neutralized with a base such as sodium hydroxide (we mean a compound which yields hydroxyl ions in solution) to a pH above 3.5, so that it can be dried without further degradation and then used as such as a drilling mud thinner (point (1) in outline) without further treatment; or the acid treated product can be further improved by oxidation directly (that is, with or without neutralization), preferably with an alkaline reagent such as potassium permanganate or sodium dichromate as indicated at point (2) in the outline. Either product may be used as a liquid, or it can be reduced to solids by evaporation and drying. In either case, these products may be used as thinners for drilling muds. Alternatively either product can be converted to the salt (3) or iron, chromium, copper and aluminum, and this is outstanding in the fact that the thinning action is improved for both fresh water and lime base muds.

Another mode of procedure following the acid treatment of the spent sulfite liquor includes forming the iron, chromium, copper and aluminum salts directly (4). Alternately, the acid treatment may be carried out with a salt giving an acid pH in water with or without additional acid, such as ferric sulfate, chromimum sulfate, copper sulfate or aluminum sulfate in such proportions as to effect also a base exchange (4). Both alternate modes of procedure yield products which are effective for thinning all types of water base drilling muds. These products may also be oxidized (5) to obtain further improvement in mud thinning properties.

Another pretreatment, which gives improvements on the sulfonated lignin-containing material preparatory to following the procedures of our invention, is the heating of the solution of the sulfonated lignin-containing material in water solution at highly elevated temperature and at a pH greater than 4 and preferably about 7 to 10. The heating is carried out for a short period of time above a temperature of 170° C. and of the order of 30 minutes at a temperature of about 200° C. At 220° C. the lignosulfonate tends to become partially insoluble in water and gel-like and is not suitable for further use for the purpose of making drilling mud thinners. This heating can be conducted while blowing the solution with a gaseous medium such as air or nitrogen. Products prepared in this manner have improved properties, said improvements in properties being somewhat equivalent to those attained by our process of acid treatment as described in our U.S. Ser. No. 723,036.

Another and highly effective procedure is to follow the process outlined in our application Ser. No. 694,737 involving treatment with alkali. This product (6) (in the outline) may then be acidified, either with an acid (7) and oxidized (8), whereby a drilling mud thinner particularly effective for lime base muds is obtained, or further processed to form the iron, copper, chromium and aluminum salt (9). Instead of acid, iron, copper, chromium and aluminum sulfate may be used through which an economical and effective spent sulfite liquor additive (10) is produced, the properties of which may be greatly enhanced by oxidation with any of the oxidizing agents previously mentioned, to yield (11) an extremely effective agent for conditioning all types of water base drilling fluids, such as, fresh water, lime base, gypsum and oil emulsion types.

Accordingly, we have discovered that acid treated spent sulfite liquor components, and materials identified in general as lignosulfonates are greatly improved in their effectiveness as dispersing agents and for use in drilling muds by treating them with one or both of the following steps:
(1) Oxidizing said spent sulfite liquor components.
(2) Treating to form a salt having an element selected from the group consisting of iron, aluminum, chromium, and copper.

The order of the above steps or treatment (oxidizing or forming a salt) is immaterial.

Continuing our treatment against contamination by calcium sulfates, the product resulting from both steps 1 and 2, or the product of step 2, is treated with a salt in the proportion of 1% to 100% of the lignosulfonate solids of said spent sulfite liquor solids, selected from the group consisting of sodium sulfate, sodium sulfite, potassium sodium tartrate, sodium oxalate, sodium phosphate, sodium carbonate, sodium bicarbonate, aluminum sulfate, iron sulfate, and their corresponding potassium compounds and mixtures thereof.

EXAMPLE I

The purpose of this example is to illustrate the improved gypsum base mud thinning properties resulting from an acid treatment in the preparation of the thinner additives of our invention as compared to the thinner additives prepared without an acid heating step. For purposes of illustration and not by way of limitation, the iron salts of an acid treated fermented spent sulfite liquor and of a fermented spent sulfite liquor without acid treatment were compared as thinners for a gypsum base mud.

The iron salt of acid treated fermented spent sulfite liquor was prepared as follows: A quantity of concentrated fermented spent sulfite liquor having 48% by weight of non-volatile solids was weighed into a glass lined reaction vessel and warmed to 60° C. Next 11.9% by weight of sulfuric acid based on the non-volatile solids was added as a 50% solution in water with agitation. This mixture was heated to 90° C. and maintained at this temperature for 15 hours with agitation. A portion of this liquor was diluted with water, neutralized to about pH 4 with lime slurry and clarified by settling while hot. Then 263 grams of the clarified liquor at 38% non-volatile solids were mixed with a solution of 40 grams of ferric sulfate (24.5% Fe) in 60 grams of water, heated at 85° C. for 30 minutes and neutralized to pH 3.5 with lime. The product was then heated 1 hour at 85–90° C., centrifuged to remove calcium sulfate, and dried at 60° C. for testing.

The iron salt of fermented spent sulfite liquor without acid treatment was prepared as follows: A 208 gram sample of concentrated fermented spent sulfite liquor having 48% by weight of non-volatile solids was heated to 80° C. and 40 grams of ferric sulfate (24.5% Fe) added as a 20% solution in water. Next approximately 11 grams of calcium hydroxide was added as a water slurry to increase the alkalinity value to pH 3.5. The product was heated 1 hour at 85–90° C., centrifuged to remove calcium sulfate and dried at 60° C. for testing.

The samples were tested for gypsum base mud thinning as hereinbefore described using a base mud mixture having 45.5 pounds per barrel of a mixture of clays containing 6 parts of a commercial drilling clay having a "yield value" of 45 barrels of 15 cp. mud per ton of clay and 1 part of a commercial drilling clay having a "yield value" of 95 barrels of 15 cp. mud per ton of clay.

THINNING GYPSUM BASE MUD BY ACID TREATED IRON SALT OF SULFITE SPENT LIQUOR

[6.0 lbs./bbl. in gypsum mud rolled 20 hours at 150° F. pH 8.2]

| Sample | Initial gel | Plastic viscosity | Yield value | 10 min. gel | API water loss |
|---|---|---|---|---|---|
| Base gypsum mud | 10.0 | 4.5 | 19.0 | 30.0 | 32.4 |
| Iron salt with no acid treatment | 2.5 | 9.0 | 9.5 | 16.0 | 16.1 |
| Iron salt with acid treatment | 1.0 | 7.0 | 5.0 | 8.0 | 10.1 |
| Iron salt with mild acid treatment followed by oxidation | 1.0 | 4.5 | 5.0 | 9.0 | 7.3 |

With reference to the above table it is seen that the sample heated under acidic conditions gives much lower yield, gels, and water loss than the iron salt made without an acidic pretreatment. It is, therefore, to be preferred as a thinner for gypsum base muds.

Further improvement is brought about by oxidation of the acid treated products. Such oxidation reduces the water loss still further but may result in a final product of higher viscosity and gels. Hence a milder acid treatment is preferred when followed by oxidation. By way of example and not limitation the last sample of the above table was prepared with a milder acid treatment and subsequently oxidized as follows: The fermented spent sulfite liquor (48%) was digested at 85 to 90° C. for 24 hours after the addition of 2.75% sulfuric acid based on the non-volatile solids. The liquor then containing 42% of non-volatile soluble solids was reacted with 20% of ferric sulfate (23.5% Fe) as a 25% aqueous solution and oxidized with 8% of sodium dichromate added as a 25% aqueous solution at 60° C. The solution was neutralized to pH 3.5 with sodium hydroxide, centrifuged to remove the calcium sulfate and dried at 60° C. The improvement effected in water loss by this treatment is shown in the data for the sample referred to as "iron salt with mild acid treatment followed by oxidation" in the table.

EXAMPLE II

This example is to illustrate the exceptionally improved mud characteristics obtained by the treatment of muds according to the invention and discovery of our copending application Serial No. 815,294, as compared with treatments according to the known art. A mud prepared from a mixture of commercial drilling clays having a yield value of 45 bbls. of 15 cp. mud per ton of clay by adding 10 parts of clay solids to 100 parts of distilled water was treated for comparison purposes with various combinations of thinners, plaster of Paris ($CaSO_4 \cdot \frac{1}{2} H_2O$) and sodium sulfate as shown in Table 1. The product of our invention (referred to as "thinner" or "additive" when used in drilling mud) was prepared as follows: A 48% solution of calcium base fermented spent sulfite liquor solids (100 g. of solids) were digested for 8 hours at 90° C. in solution with sufficient sodium hydroxide to obtain a product with a pH of 8.0. This product was treated by adding a solution containing 20 grams of ferric sulfate in 75 cc. of water, heated to 80° C. and centrifuged to remove calcium sulfate, then a solution containing 4 grams of sodium dichromate in 15 cc. of water was added, and the solution heated to 90° C. The water was removed by evaporation and the solids reduced to dryness by heating on a steam bath.

Table 1 of Example II.—The first three tests in Table 1 show the mud: (1) not thinned, (2) thinned by quebracho, and (3) thinned by the above described thinner of our invention. When plaster of Paris is added to the base mud (test 4) a high initial gel and water loss is developed. When sodium sulfate is added to the mud of test 4 the water loss is decreased, but viscosity and gels become higher. These are the characteristic behaviors of drilling muds in the presence of these additives described in the literature on drilling muds. Tests 6 and 7 show the high initial gels and high gel rate obtained on thinning a gypsum contaminated mud with quebracho and the failure of the addition of sodium sulfate in moderate quantity in the presence of quebracho to substantially reduce initial gels and water loss. In contrast the process and product of the present invention, as shown by test 8, produces a low viscosity and initial gel as well as low gel rate in gypsum contaminated mud and also, as shown by tests 9 and 10, permits the reduction in water loss by addition of sodium sulfate even in the presence of large amounts of gypsum. In fact, as shown by test 11, on addition of more thinner the water loss of the original mud may be restored with sodium sulfate while maintaining a low gel rate and lower viscosity and gels than in the original uncontaminated mud.

Example II has demonstrated that the product and process of our above-identified invention, including the sodium sulfate part of this invention, permits treatment of gypsum contaminated muds with results not found possible with the known processes of the prior art. The treatment not only corrects the mud properties for the bad effects of gypsum ($CaSO_4.2H_2O$) contamination, but also renders the mud resistant to further gypsum contamination.

*Table 1 of Example II*

| Test No. | Thinner added | | Plaster of Paris, lb./bbl. | $Na_2SO_4$, lb./bbl. | Mud test after aging 24 hrs. | | | |
|---|---|---|---|---|---|---|---|---|
| | Name | lb./bbl. | | | I.G. | Visc. | 10 G. | W.L. |
| 1 | None | 0 | 0 | 0 | 10 | 39.7 | 90 | 9.0 |
| 2 | Quebracho | 0.5 | 0 | 0 | 0 | 34.0 | 30 | 9.2 |
| 3 | Thinner [1] | 0.5 | 0 | 0 | 0 | 30.5 | 30 | 9.8 |
| 4 | None | 0 | 3.0 | 0 | 95 | 34.0 | 110 | 41.9 |
| 5 | do | 0 | 3.0 | 3.0 | 150 | 71.7 | 330 | 12.0 |
| 6 | Quebracho | 2.0 | 3.0 | 0 | 50 | 30.1 | 50 | 51.0 |
| 7 | do | 2.0 | 3.0 | 2.0 | 30 | 27.5 | 30 | 36.0 |
| 8 | Thinner [1] | 2.0 | 3.0 | 0 | 0 | 9.8 | 15 | 23.0 |
| 9 | do.[1] | 1.5 | 3.0 | 1.5 | 0 | 14.0 | 25 | 12.8 |
| 10 | do.[1] | 1.5 | 9.0 | 1.5 | 0 | 14.0 | 25 | 12.5 |
| 11 | do.[1] | 3.0 | 3.0 | 2.0 | 0 | 19.0 | 20 | 9.4 |

[1] Thinner—Additive preparation described in example.

EXAMPLE III

This example further illustrates the process of the present invention as applied to the combination of acid treatment, formation of the iron salt, and oxidation with dichromate.

To a concentrated solution of fermented spent sulfite liquor solids were added 10% by weight of ferric sulfate based on the liquor solids and 4% by weight of sulfuric acid dissolved in water to make a final composition having a total solids of 40% in the liquid phase. The mixture was passed through a heating vessel and stirred continually under about 110 pounds' pressure at a temperature of 140° C. The mixture was fed to the vessel at the same rate as the withdrawal rate, giving a calculated average retention time of about 1 hour. The purpose of this manner of heating was to test the feasibility of the process for continuous production. The withdrawn product was cooled to 60–80° C., diluted to 35% solids in the liquid phase and then oxidized according to the procedure of copending application Ser. Nos. 539,542 and 815,294 by adding 7% by weight of sodium dichromate based on soluble solids as a 25% solution with vigorous stirring, followed by heating the product mixture for 1 hour at 85–100° C., centrifuged to remove insolubles, and dried.

The dried product was tested as a mud thinner (dispersing agent) in a gypsum contaminated laboratory mud prepared by adding the thinner and plaster of Paris simultaneously to a well aged suspension of commercial drilling clays in water. The test results were compared with drilling mud test results obtained using the product described in Example II herein and with a combination of carboxymethyl cellulose (commonly used in drilling muds to control water loss) and the product of Example II.

The reaction product described in said Example II used for comparison purposes in relation to this example of the present invention, was prepared by digesting 100 grams calcium base fermented spent sulfite liquor solids for 8 hours at 90° C. in sufficient sodium hydroxide solution to obtain a reaction product with a pH of 8.0. This product was treated by adding a solution containing 20 grams of ferric sulfate, heating to 80° C., and centrifuging to remove the precipitated calcium sulfate. Then a solution containing 4 grams of sodium dichromate was added as an oxidizing agent, and a solution heated at 90° C. The water was removed by evaporation of the solids to dryness by heating on a steam bath.

To show the comparative test results in contaminated oil well drilling mud, Table 1 of this example, as set forth below, shows that the product of acid polymerization treatment gives better low water loss in so-called gyp mud than a product of said Example II.

As indicated, one prior method of obtaining low water loss is adding carboxymethylcellulose. Table 1 below also shows that the low yield value and low gel strengths obtained with the present invention and discovery, as compared with the use of carboxymethylcellulose, are significantly better in that carboxymethylcellulose has a pronounced thickening effect on the mud.

*Table 1 of Example III*

| Mud treatment | Rolled 24 hrs. 150° F. | | | | | |
|---|---|---|---|---|---|---|
| | pH | I.G. | P.V. | Y. | 10 G. | W.L. |
| 6 lb./bbl., dried reaction product of this example | 8.2 | 3.5 | 6.0 | 8.0 | 11.0 | 7.6 |
| 6 lb./bbl. of product Example II | 8.2 | 2.0 | 8.5 | 8.0 | 13.0 | 11.2 |
| 3 lb./bbl. of product Example II and 2 lb./bbl. carboxymethyl cellulose | 8.2 | 4.0 | 17.0 | 9.0 | 42.0 | 8.7 |

EXAMPLE IV

To show that an improved product may be obtained by a combination of acid treatment and an oxidation treatment (such as with 4% bichromate solution), such as described in Example V of our copending application Ser. No. 539,542, a sample of fermented spent sulfite liquor was first subjected to an acid treatment and then oxidized by adding 4% of sodium bichromate based on spent sulfite liquor solids. Samples taken after each step were neutralized to pH 4.0 with NaOH, dried at 60° C. and tested as thinners for limed muds.

A 50% solution of sulfuric acid containing 12% of sulfuric acid based on the spent sulfite liquor solids was mixed with a concentrated fermented spent sulfite liquor to obtain a solution containing 60% by weight of spent sulfite liquor solids. The mixture was heated at 65° C. for 6 hours and then diluted with water and neutralized to pH 4 with sodium hydroxide. The mixture was centrifuged to remove calcium sulfate and a portion dried for testing.

A 25% solution of sodium bichromate containing 4% of sodium bichromate based on the spent sulfite liquor solids was added to the remaining acid treated liquor. The mixture was heated 30 minutes at 90° C. and then dried for testing.

Drilling mud tests of this product, as reflected by Table 1 of Example IV, show that the sodium bichromate treatment further lowered the yield and 10 minute gels of limed muds well below those obtained with the acid treatment.

diluted and neutralized to pH 4.0 with lime, centrifuged hot to remove calcium sulfate and dried in air at 60° C.

*Table 1 of Example IV*

| Sample | Lb./bbl. | Rolled overnight room temp. | | | | | Rolled 20 hrs. 150° F. | | | | |
|---|---|---|---|---|---|---|---|---|---|---|---|
| | | I.G. | P.V. | Y. | 10 G. | W.L. | I.G. | P.V. | Y. | 10 G. | W.L. |
| Fermented SSL, no treatment | 4.0 | 10.0 | 7.0 | 9.5 | 83.0 | 13.4 | 8.0 | 7.0 | 7.0 | 45.0 | 14.5 |
| | 6.0 | 2.0 | 6.0 | 5.5 | 42.0 | 13.4 | 1.0 | 7.0 | 3.0 | 17.0 | 15.6 |
| Acid treatment, 12% H₂SO₄, 60% T.S., 65° C., 6 hrs. | 4.0 | 3.0 | 9.5 | 8.0 | 51.0 | 13.2 | 2.0 | 7.5 | 6.0 | 30.0 | 12.9 |
| | 6.0 | 1.0 | 9.5 | 3.0 | 13.0 | 11.0 | 1.0 | 7.5 | 2.5 | 3.0 | 13.6 |
| 4% bichromate, oxidation of acid treated SSL. | 4.0 | 0.5 | 9.0 | 3.0 | 9.5 | 12.1 | 0.5 | 7.5 | 3.5 | 5.0 | 13.2 |
| | 6.0 | 0.5 | 9.0 | 1.5 | 1.0 | 10.1 | 0.5 | 7.5 | 1.5 | 0.5 | 13.3 |

EXAMPLE V

To show that an improved product may be obtained by a combination of acid treatment and a partial base exchange with iron, chromium or aluminum salts similar to the base exchange (such as with 5% ferric sulfate solution), as described in Example VII of our copending application Ser. No. 539,542, a sample of fermented spent sulfite liquor was first subjected to an acid treatment and then partially base exchanged with ferric sulfate. Samples taken after each step were neutralized to pH 4.0 with sodium hydroxide, dried at 60° C. and tested as thinners for limed muds.

12% of sulfuric acid by weight based on the spent sulfite liquor solids together with sufficient water to reduce the concentration of spent liquor solids to 40% were added to fermented spent sulfite liquor having a concentration of 48% by weight of non-volatile solids. The mixture was then heated at 140° C. in a sealed bomb for 0.75 hour. The product liquor was diluted and neutralized with sodium hydroxide to pH 4 and then centrifuged to remove calcium sulfate. The clarified liquor was dried for testing. A portion of the acid treated product was dissolved in water and 5% of ferric sulfate based on the dry solids was added as a water solution. The mixture was heated to 90° C., centrifuged to remove calcium sulfate and the clarified liquor dried for testing.

Drilling mud tests made with a laboratory limed mud, Table 1 of Example V show that the partial base exchange with ferric sulfate has lowered the mud yield and 10 minute gels well below those obtained with the acid treatment.

The sodium salt of acid treated spent sulfite liquor was prepared by dissolving 50 g. of the above calcium salt of acid treated spent sulfite liquor in water, adding 8.6 g. of sodium sulfate as a water solution and removing the resulting precipitate of calcium sulfate by heating to 85 to 90° C. and centrifuging. The product was dried in air at 60° C.

The iron salt of the acid treated spent sulfite liquor was prepared by dissolving 50 g. of the sample in water, adding 7.5 g. of ferric sulfate (24.5% Fe) as a water solution and neutralizing to about pH 4 with sodium hydroxide. The product was heated 1 hour at 85 to 90° C., centrifuged to remove calcium sulfate, and dried in air at 60° C.

These samples were tested as water loss agents for a gypsum saturated drilling mud at 2.0, 4.0 and 6.0 lbs./bbl. in comparison with a commercial starch sold as a water loss agent for drilling mud under the trade name "Mylogel" by the Magnet Cove Barium Corporation of Houston, Texas.

With reference to Table 1 of Example VI both the sodium and the iron salt are as effective as starch for lowering water loss, but unexpectedly and uniquely does not like starch further increase the plastic viscosity. Furthermore, while the sodium salt increases the yield and gels similar to starch, the iron salt does not. Note well that increase in plastic viscosity is an objectionable effect common to commercial water loss agents such as starch and carboxymethyl cellulose (see Table 1 of Example VI). Also, generally the usual drilling mud thinners are not effective to control plastic viscosity and the mud

*Table 1 of Example V*

| Sample | Lb./bbl. | Rolled overnight room temp. | | | | | Rolled 20 hrs. 150° F. | | | | |
|---|---|---|---|---|---|---|---|---|---|---|---|
| | | I.G. | P.V. | Y. | 10 G. | W.L. | I.G. | P.V. | Y. | 10 G. | W.L. |
| Fermented SSL, no treatment | 4.0 | 10.0 | 7.0 | 9.5 | 83.0 | 13.4 | 8.0 | 7.0 | 7.0 | 45.0 | 14.5 |
| | 6.0 | 2.0 | 6.0 | 5.5 | 42.0 | 13.4 | 1.0 | 7.0 | 3.0 | 17.0 | 15.6 |
| 12% H₂SO₄, 40% T.S., 140° C., 0.75 hr. | 4.0 | 3.5 | 10.5 | 15.0 | 93.0 | 11.6 | 1.0 | 8.5 | 7.0 | 34.0 | 11.6 |
| | 6.0 | 1.0 | 12.0 | 5.0 | 16.0 | 9.8 | 1.0 | 9.5 | 3.0 | 3.0 | 9.7 |
| 5% ferric sulfate base exchange of acid treatment SSL. | 4.0 | 2.0 | 12.5 | 6.5 | 46.0 | 13.9 | 1.0 | 8.5 | 3.5 | 12.5 | 15.0 |
| | 6.0 | 1.5 | 5.5 | 20.0 | 47.0 | 10.6 | 1.0 | 12.0 | 3.5 | 5.5 | 11.6 |

EXAMPLE VI

This example describes the preparation of a product with especially useful water loss properties by acid treatment as herein disclosed to a point short of formation of insoluble products, but carried past the range of improvement in drilling mud thinner properties as determined by measurement of gel strength in limed mud. By way of example and not limitation a strongly acid treated spent sulfite liquor was base exchanged to the sodium and iron salts, and these salts were tested as water loss agents for gypsum base mud in comparison with starch.

The acid treated spent sulfite liquor was prepared by adding 20% by weight of sulfuric acid based on non-volatile solids to a concentrated fermented calcium base spent sulfite liquor having 40% by weight of non-volatile solids (giving a pH of 0.23) and heating the mixture at a temperature of 70° C. for six days. The product was must be thinned by adding water, which is very objectionable because it decreases the density of the mud.

*Table 1 of Example VI*

WATER LOSS AGENT TESTS IN GYPSUM BASE DRILLING MUD

[Mud pH 8.2, rolled 20 hours at 150° C.]

| Sample | Lbs./bbl. | I.G. | P.V. | Yield | 10 G. | W.L. |
|---|---|---|---|---|---|---|
| Base gyp mud | | 1.0 | 5.0 | 4.5 | 10.5 | 13.5 |
| Starch (Mylogel) | 2.0 | 1.5 | 7.5 | 7.5 | 13.0 | 9.2 |
| | 4.0 | 1.5 | 10.5 | 9.5 | 15.5 | 6.9 |
| | 6.0 | 2.0 | 10.5 | 13.5 | 22.0 | 4.7 |
| Sodium salt of acid treated spent sulfite liquor. | 2.0 | 1.5 | 6.0 | 6.0 | 11.0 | 7.6 |
| | 4.0 | 1.5 | 7.0 | 7.5 | 12.0 | 6.4 |
| | 6.0 | 2.5 | 7.5 | 11.0 | 15.0 | 5.4 |
| Iron salt of acid treated spent sulfite liquor. | 2.0 | 1.0 | 6.0 | 4.0 | 8.5 | 9.1 |
| | 4.0 | 1.5 | 7.0 | 5.0 | 8.5 | 6.8 |
| | 6.0 | 1.5 | 7.5 | 4.5 | 7.5 | 5.5 |

EXAMPLE VII

This example illustrates the improvement in mud thinning properties of an acid treated spent sulfite liquor obtained by oxidation. By way of example and not limitation, mud tests were made as hereinbefore described in limed mud on an acid treated spent sulfite liquor and the same material oxidized with ammonium persulfate and by electrolytic oxidation. Mud tests were also made as hereinbefore described in fresh water and gyp muds using the iron salts of these products.

The acid treated spent sulfite liquor was prepared as follows: A batch of 612 grams of concentrated fermented calcium base spent sulfite liquor having 300 g. of non-volatile solids was acidified by adding 10.5 g. of sulfuric acid as a solution 138 g. of water. The mixture, pH 1.8, was heated for 24 hours at 93° C. and then neutralized to pH 4.0, by adding 5.0 g. of calcium hydroxide as a slurry. One-sixth (50 g. solids) of the reaction product was centrifuged to remove calcium sulfate and dried in air at 60° C. The remainder was used for preparation of samples described below.

The iron salt of the acid treated spent sulfite liquor was prepared as follows: One-sixth (50 g. solids) of the above acid treated spent sulfite liquor product was base exchanged to the iron salt by adding 30 g. of a 25% solution of ferric sulfate. The solution was neutralized to pH 4.3 by adding sodium hydroxide, heated 1 hour at 85–90° C., centrifuged to remove calcium sulfate and dried in air at 60° C.

The ammonium persulfate oxidized acid treated spent sulfite liquor was prepared as follows: One-third (100 g. solids) of the above acid treated spent sulfite liquor was oxidized by adding a solution of 15 g. of ammonium persulfate in water and then heating to 80° C. Half of the oxidized product was neutralized to pH 4 with sodium hydroxide, heated for 1 hour at 85 to 90° C., centrifuged to remove calcium sulfate, and dried in air at 60° C.

The iron salt of ammonium persulfate oxidized acid treated spent sulfite liquor was prepared as follows: The remaining half of the above ammonium persulfate oxidized product (50 g. orginial SSL solids) was base exchanged to the iron salt by adding 30 g. of 25% ferric sulfate solution. The mixture was neutralized to pH 3.1 with sodium hydroxide, heated 1 hour at 85–90° C., centrifuged to remove calcium sulfate and dried in air at 60° C.

The electrolyzed acid treated spent sulfite liquor was prepared as follows: One-third (100 g. solids) of the above acid treated spent sulfite liquor was electrolyzed between platinum electrodes with 0.4 ampere hours of direct current per gram of solids at a temperature of 50° C. after diluting the liquor to about 20% non-volatile solids with water. Half of the electrolyzed product was neutralized to pH 3.5 with sodium hydroxide, concentrated to about 35% non-volatile solids, heated 1 hour at 85–90° C., centrifuged to remove calcium sulfate, and dried in air at 60° C.

The iron salt of electrolyzed acid treated spent sulfite liquor was prepared as follows: The remaining half of the above described electrolyzed product was base exchanged to the iron salt by adding 30 g. of a 25% solution of ferric sulfate. The mixture was neutralized to pH 3.8 with sodium hydroxide, heated 1 hour at 85 to 90° C., centrifuged to remove calcium sulfate, and dried in air at 60° C.

By examination of Tables 1, 2 and 3 of Example VII, the substantially improved mud thinning and water loss reducing properties of the products of our invention and discovery made by the combination of acid treatment, oxidation and formation of the metal salt of the sulfonated lignin containing material is manifest.

Table 1 of Example VII
LIMED MUD THINNING TEST RESULTS

[6.0 lbs./bbl. in limed mud; muds rolled 20 hrs. at 150° F.]

| Sample | Initial gel | Yield value | 10 min. gel | API water loss |
|---|---|---|---|---|
| Untreated spent sulfite liquor | 1.5 | 3.0 | 10.5 | 15.0 |
| Acid treated spent sulfite liquor | 1.0 | 2.0 | 2.0 | 13.2 |
| Ammonium persulfate oxidized acid treated spend sulfite liquor | 1.0 | 1.5 | 1.5 | 12.7 |
| Electrolyzed acid treated spent sulfite liquor | 1.0 | 0 | 0.5 | 9.6 |

Table 2 of Example VII
FRESH WATER MUD THINNING TEST RESULTS

[2.0 lbs./bbl. at pH 9.5; muds rolled 20 hours at 150° F.]

| Sample | Initial gel | Yield value | 10 min. gel | API water loss |
|---|---|---|---|---|
| Base fresh water mud | 20.0 | 34.0 | 62.0 | 13.3 |
| Iron salt of acid treated spent sulfite liquor | 3.5 | 8.5 | 24.0 | 12.2 |
| Iron salt of ammonium persulfate oxidized acid treated spent sulfite liquor | 1.5 | 8.0 | 14.0 | 10.5 |
| Iron salt of electrolyzed acid treated spent sulfite liquor | 1.5 | 6.5 | 20.0 | 11.6 |

Table 3 of Example VII
GYP MUD THINNING TEST RESULTS

[6.0 lbs./bbl. in pH 8.2 gyp mud; rolled 20 hrs. at 150° F.]

| Sample | Initial gel | Yield value | 10 min. gel | API water loss |
|---|---|---|---|---|
| Base gyp mud | 13.0 | 15.5 | 46.5 | 30.0 |
| Iron salt of acid treated spent sulfite liquor | 2.5 | 11.5 | 15.5 | 12.9 |
| Iron salt of ammonium persulfate oxidized acid treated spent sulfite liquor | 1.0 | 5.0 | 10.5 | 10.5 |
| Iron salt of electrolyzed acid treated spent sulfite liquor | 1.0 | 6.0 | 12.0 | 10.2 |

EXAMPLE VIII

By way of example and not limitation, samples of spent sulfite liquor and acid treated spent sulfite liquor oxidized with sodium dichromate were tested as gyp mud thinners as hereinbefore described.

A sample of fermented calcium base spent sulfite liquor, concentrated to 40% non-volatile solids, was acidified with 3.8% of sulfuric acid based on the spent sulfite liquor solids and heated for 24 hours at 90° C., pH 1.2. Samples of the acid treated product and the original liquor each containing 50 g. of non-volatile spent sulfite liquor solids were weighed out and acidified with sulfuric acid equivalent to the calcium not present as calcium sulfate. The total sulfuric acid added was equal to 12% of the original spent sulfite liquor solids, i.e., about equivalent to the calcium content.

Each sample was oxidized at 50° C. by adding 9% of sodium dichromate dihydrate based on the spent sulfite liquor solids as a 25% solution with vigorous stirring. The products were neutralized to pH 3.5 by adding sodium hydroxide as a 10% solution, heated 1 hour at 85–90° C., centrifuged to remove calcium sulfate and dried in air at 60° C.

With reference to Table 1 of Example VIII, the mud test results show significantly improved thinning properties, i.e., lower yield value, gels and water loss for the products made with acid treated spent sulfite liquor than for those made with spent sulfite liquor with no acid treatment.

Table 1 of Example VIII
GYP MUD THINNING TEST RESULTS

[6.0 lbs./bbl. in gyp mud, pH 8.2; mud rolled 20 hrs. at 150° F.]

| Sample | Initial gel | Yield value | 10 min. gel | API water loss |
|---|---|---|---|---|
| Base gyp mud | 13.0 | 15.5 | 46.5 | 30.1 |
| Spent sulfite liquor oxidized with 9% of sodium dichromate | 2.0 | 8.0 | 9.5 | 11.9 |
| Acid treated spent sulfite liquor oxidized with 9% of sodium dichromate | 1.5 | 6.5 | 7.5 | 9.6 |

EXAMPLE IX

This example illustrates that polymerization and improvement in dispersant properties as demonstrated by drilling mud thinning tests are obtained by acid treatment of spent sulfite liquor even at very low concentrations.

Samples of a fermented calcium base spent sulfite liquor were diluted with water to 5% and 2.5% of non-volatile solids and acidified by adding 12% of sulfuric acid based on the non-volatile solids. The samples were then sealed in glass lined pressure vessels and heated at 140° C. for times shown in Table 1 of Example IX. After heating, the samples were cooled, neutralized with lime to pH 4.5, concentrated by evaporation on the steam bath, centrifuged to remove calcium sulfate and dried in air at 60° C. The dried samples were tested as thinners for limed base muds in comparison with the original fermented calcium base spent sulfite liquor.

With reference to Table 1 of Example IX, the products had a lower diffusion coefficient (higher molecular weight) and showed greater reduction in gels and lowering of water loss in limed muds than the original spent sulfite liquor. The good results obtained at 2.5% total solids indicate that polymerization can be accomplished even at low total solids content.

Table 1 of Example IX
RESULTS OF ACID POLYMERIZATION AT LOW TOTAL SOLIDS

[12% $H_2SO_4$ at 140° C.]

| Sample | Time at 140° C. (hours) | Diffusion[1] coefficient ($mm.^2$/day) | Limed mud test results | |
|---|---|---|---|---|
| | | | 10 min. gel, 4.0 lb./bbl. | Water loss, 6.0 lb./bbl. |
| Original fermented spent sulfite liquor | | 13.4 | 20.0 | 14.4 |
| Polymerized at 5% total solids | 5 | 11.8 | 6.0 | 10.5 |
| Polymerized at 2.5% total solids | 11.5 | 10.6 | 6.5 | 10.8 |

[1] The diffusion coefficients were measured by the method of Felicetta, et al, Journal of the American Chemical Society, Vol. 71, p. 2879, August 1949.

By "purifying" herein is meant partially or completely removing the nonlignosulfonate portions of the spent sulfite liquor as by fermentation, fractionation, lime precipitation in bulk or by small increments, by salting out, or by reaction with organic amines and separation as precipitates or as nonmiscible solutions; in short, by any of the methods known to the art. Particularly, "purifying" includes the removal of sulfur dioxide, otherwise unnecessary consumption of the oxidizing agent occurs. Such removal may be accomplished by steam stripping and/or air blowing and this particularly at elevated temperatures. "Purifying" may also include removal of insoluble inorganic precipitates such as calcium sulfite and sulfate. In fractionating we include fractionation with aqueous organic solvents. By "separating" the spent sulfite liquor solids is meant isolating in whole or in part the said solid components of the spent sulfite liquor by any of the methods herein disclosed. By "concentrating" the spent sulfite liquor solids is meant reducing the volatile content of the spent sulfite liquor in part or to the degree that there remain only the solid components of the spent sulfite liquor.

When the phrase, "adding to the spent sulfite liquor solid components" is used, the solids could be in the original solution or isolated by any of the methods herein mentioned or known to the art. When the statement is herein used "treating to form a salt having an element selected from the group consisting of iron, aluminum, chromium, and copper," it is intended, of course, to include combinations of said elements. Likewise, in the listing of the oxidizing agents, combinations of said agents where chemically feasible are included. When it is directed to "add to" or "treat spent sulfite liquor," it is intended to employ or treat said liquor substantially as received from the digester excepting that the temperature of the spent sulfite liquor may be as it is received from the digester or after the spent sulfite liquor is cooled.

Where fermented spent sulfite liquor was used, in the examples herein it was prepared from the effluent from the commercial production of ethyl alcohol by fermentation of spent sulfite liquor with baker's yeast (*Saccharomyces cerevisiae*). In the fermentation process the spent sulfite liquor as it is received from the blowpit is stripped (distilled) with steam to remove sulfur dioxide, cooled to about 30° C. and neutralized to about pH 4.5 with lime. Baker's yeast is then added to the neutralized spent sulfite liquor to ferment the hexose sugars present to alcohol. The fermentation lowers the reducing value of the spent sulfite liquor as measured by Fehling's solution from about 24 percent to about 10 percent expressed as glucose and based on the spent sulfite liquor solids. Yeast is recovered for reuse by centrifuging and the alcohol is removed from the fermented liquor by stripping with steam. The resultant liquor is the fermented spent sulfite liquor. This method of fermentation is disclosed more fully in United States Letters Patent No. 2,430,355 granted to Joseph L. McCarthy on November 4, 1947. Any method of fermentation which primarily utilized the carbohydrates may be used. The fermentation may be either anaerobic or aerobic by any of a number of microorganisms including bacteria and yeast of the Torula genus.

In using a gypsum base mud, the calcium sulfate may be added to the mud from the strata being drilled.

Where examples of substances are given it is to be understood the same is done by way of illustration and not limitation.

We claim:

1. A process for producing useful products from sulfonated lignin-containing material comprising the step of forming a water soluble salt of an acid polymerized sulfonated lignin-containing material, said salt containing a metal salt selected from the group consisting of iron, aluminum, copper, chromium and combinations thereof.

2. The process of claim 1 wherein said sulfonated lignin-containing material is obtained from spent sulfite liquor.

3. A process for producing useful products from sulfonated lignin-containing material comprising the step of forming a water soluble salt of an acid polymerized sulfonated lignin-containing material, said salt having a cation selected from the group consisting of iron, aluminum, chromium, copper and combinations thereof, and oxidizing said salt with an oxidizing agent having an oxidizing power stronger than an oxidation potential of about −1.3.

4. The process of claim 3 wherein said sulfonated lignin-containing material is obtained from spent sulfite liquor and wherein said oxidizing agent is selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, electrolytic oxidation and combinations thereof.

5. The process of claim 2 wherein the sulfonated lignin-containing material is polymerized by heating said spent sulfite liquor at a pH of less than about 4.0 at a temperature above about 50° C. for a time sufficient to polymerize the lignosulfonic acid in said spent sulfite liquor, the temperature and time conditions being short of those which bring about substantial insolubilization of the polymerized reaction product.

6. The process of claim 3 wherein the sulfonated lignin-containing material is polymerized by heating said spent sulfite liquor at a pH of less than about 4.0 at a temperature above about 50° C. for a time sufficient to polymerize the lignosulfonic acid in said spent sulfite liquor, the temperature and time conditions being short of those which bring about substantial insolubilization of the polymerized reaction product.

7. The process of claim 4 wherein the sulfonated lignin-containing material is polymerized by heating said spent sulfite liquor at a pH of less than about 4.0 at a temperature above about 50° C. for a time sufficient to polymerize the lignosulfonic acid in said spent sulfite liquor, the temperature and time conditions being short of those which bring about substantial insolubilization of the polymerized reaction product.

8. The process of claim 5 wherein the metal ion is iron.

9. The process of claim 5 wherein the metal ion is aluminum.

10. The process of claim 5 wherein the metal ion is chromium.

11. The process of claim 5 wherein the metal ion is copper.

12. The process of claim 7 wherein the metal ion is iron and the oxidizing agent is an alkali metal chromate.

13. The process of claim 7 wherein the metal ion is chromium and the oxidizing agent is an alkali metal chromate.

14. A process for producing useful water soluble products from sulfonated lignin-containing material comprising the step of oxidizing an acid polymerized sulfonated lignin-containing material with an oxidizing agent having an oxidizing power stronger than an oxidation potential of about −1.3.

15. The process of claim 14 wherein said sulfonated lignin-containing material is obtained from spent sulfite liquor and wherein said oxidizing agent is selected from the group consisting of hyrdogen peroxide, ozone, lead dioxide, chromic acid, chlorine, alkali and alkaline earth metal hypochlorites, alkali metal chromate, alkali metal permanganate, alkali metal persulfate, alkali metal perborate, electrolytic oxidation and combinations thereof.

16. The process of claim 15 wherein the sulfonated lignin-containing material is polymerized by heating said spent sulfite liquor at a pH of less than about 4.0 at a temperature above about 50° C. for a time sufficient to polymerize the lignosulfonic acid in said spent sulfite liquor, the temperature and time conditions being short of those which bring about substantial insolubilization of the polymerized reaction product.

17. The process of claim 2 wherein the spent sulfite liquor is heat treated under alkaline conditions and wherein the lignosulfonic acid constituent of the spent sulfite liquor is acid polymerized.

18. The process of claim 5 wherein the pH is obtained by the addition of sulfuric acid to the spent sulfite liquor.

19. The process of claim 16 wherein the pH is obtained by the addition of sulfuric acid to the spent sulfite liquor.

20. The product of the process of claim 1.

21. The product of the process of claim 4.

22. The product of the process of claim 8.

23. The product of the process of claim 9.

24. The product of the process of claim 10.

25. The product of the process of claim 11.

26. The product of the process of claim 12.

27. The product of the process of claim 13.

28. The product of the process of claim 16.

29. The product of the process of claim 17.

30. A process for producing useful water soluble products from sulfonated lignin-containing material comprising heating a sulfonated lignin-containing material at a pH of less than about 4.0 and temperatures above about 50° C. for a time and temperature short of those which bring about substantial insolubilization, and forming a salt of said sulfonated lignin-containing material, said salt having a cation selected from the group consisting of iron, aluminum, chromium, copper and combinations thereof.

31. A process for producing useful water soluble products from sulfonated lignin-containing material comprising heating a sulfonated lignin-containing material at a pH of less than about 4.0 and at temperatures above 50° C. for a time and temperature short of those which bring about substantial insolubilization and oxidizing said sulfonated lignin-containing material with an oxidizing agent having an oxidizing power stronger than an oxidation potential of about −1.3.

32. A process for producing useful water soluble products from sulfonated lignin-containing material comprising heating a sulfonated lignin-containing material at a pH of less than about 4.0 and temperatures above about 50° C. for a time and temperature short of those which bring about substantial insolubilization, forming a salt of said sulfonated lignin-containing material, said salt having a cation selected from the group consisting of iron, aluminum, chromium, copper and combinations thereof, and oxidizing said salt of said sulfonated lignin-containing material with an oxidizing agent having an oxidizing power stronger than oxidation potential of about −1.3.

33. A process for producing useful products from sulfonated lignin-containing material comprising the step of forming a water soluble salt of an acid polymerized spent sulfite liquor by interacting said spent sulfite liquor with a soluble metal ion selected from the group consisting of iron, aluminum, chromium, copper and mixtures thereof, said metal ion being present in an amount chemically equivalent to 1 to 50% of the sulfate salt thereof, based on the weight of the spent sulfite liquor solids.

34. A process for producing useful products from sulfonated lignin-containing material comprising the step of forming a soluble complex salt of an acid polymerized sulfonated lignin-containing material, said complex salt containing a cation selected from the group consisting of iron, aluminum, chromium, copper and mixtures thereof.

35. A process for producing useful products from acid polymerized sulfonated lignin-containing material comprising the step of complexing said material with a metal selected from the group consisting of iron, aluminum, chromium, copper and mixtures thereof, to produce a soluble product, said metal being present in an amount chemically equivalent to 1 to 50% of the sulfate salt thereof, based on the weight of the sulfonated lignin in said material.

36. The process of claim 8 wherein the iron is present in an amount chemically equivalent to 1 to 50% of the sulfate salt thereof, based on the weight of the spent sulfite liquor solids.

References Cited in the file of this patent

UNITED STATES PATENTS

| | | |
|---|---|---|
| 2,401,373 | Robinson et al. | June 4, 1946 |
| 2,491,436 | Barnes | Dec. 13, 1949 |
| 2,822,358 | Hearon et al. | Feb. 4, 1958 |
| 2,935,473 | King et al. | May 3, 1960 |
| 2,935,504 | King et al. | May 3, 1960 |